United States Patent
Ariyoshi et al.

(10) Patent No.: US 6,822,707 B2
(45) Date of Patent: Nov. 23, 2004

(54) OPTICAL SHEET AND DISPLAY DEVICE HAVING THE OPTICAL SHEET

(75) Inventors: Toshihiko Ariyoshi, Ibaraki (JP); Masaya Adachi, Hitachi (JP); Makoto Tsumura, Hitachi (JP)

(73) Assignee: Nitto Denko Corporation, Osaka (JP)

( * ) Notice: Subject to any disclaimer, the term of this patent is extended or adjusted under 35 U.S.C. 154(b) by 135 days.

(21) Appl. No.: 10/265,769

(22) Filed: Oct. 8, 2002

(65) Prior Publication Data

US 2003/0072080 A1 Apr. 17, 2003

(30) Foreign Application Priority Data

Oct. 11, 2001 (JP) .................................... P2001-313983

(51) Int. Cl.⁷ .......................................... G02F 1/1335
(52) U.S. Cl. .............................. 349/112; 349/95; 349/5
(58) Field of Search .......................... 349/64, 112, 95; 359/619, 599, 707

(56) References Cited

U.S. PATENT DOCUMENTS

| | | | | |
|---|---|---|---|---|
| 5,159,478 A | * | 10/1992 | Akiyama et al. | 349/112 |
| 5,392,140 A | * | 2/1995 | Ezra et al. | 349/15 |
| 5,600,456 A | * | 2/1997 | Maruyama et al. | 349/64 |
| 5,691,788 A | * | 11/1997 | Kim | 349/96 |
| 6,527,410 B2 | * | 3/2003 | Yamaguchi | 362/243 |
| 2001/0012078 A1 | | 8/2001 | Hira et al. | |
| 2001/0015780 A1 | | 8/2001 | Yamaguchi | |

FOREIGN PATENT DOCUMENTS

| | | |
|---|---|---|
| EP | 0 945 742 A1 | 9/1999 |
| JP | 9-505412 | 5/1997 |
| JP | 10-039769 | 2/1998 |
| JP | 10-160911 | 6/1998 |
| JP | 10-260638 | 9/1998 |
| WO | WO 95/14255 | 5/1995 |

* cited by examiner

*Primary Examiner*—Toan Ton
(74) *Attorney, Agent, or Firm*—Sughrue Mion, PLLC

(57) ABSTRACT

An optical sheet has a transparent base material; a fine lens array constituted by a plurality of fine unit lenses formed on a front surface of the transparent base material; a diffusing layer formed on a rear surface of the transparent base material opposite to the surface on which the fine lens array is formed; and a light absorbing layer formed on the diffusing layer and including fine opening portions substantially located at focal points of the unit lenses; wherein: the diffusing layer is made of a transparent medium containing transparent fine particles different in refractive index from the transparent medium; and the transparent fine particles have a mean particle size in a particle size range for maximizing a value of Q/R at each of wavelengths in a visible region when Q is a scattering sectional area per transparent fine particle, and R is a radius of each of the transparent fine particles.

6 Claims, 20 Drawing Sheets

OPTICAL SHEET AND DISPLAY DEVICE HAVING THE OPTICAL SHEET

The present application is based on Japanese Patent Application No. 2001-313983, which is incorporated herein by reference.

BACKGROUND OF THE INVENTION

1. Field of the Invention

The present invention relates to an optical sheet used as a transmission type screen member in a back projection type display device or as a viewing angle enlarging member in a liquid-crystal display device, and a display device using the optical sheet.

2. Description of the Related Art

Generally, a back projection type display device using a liquid-crystal display element or a dot matrix display element such as a digital mirror device has a projector for outputting image light formed through a display element, a reflecting mirror having a function of reflecting the image light outputted from the projector to change the direction of movement of the image light, and a transmission type screen for spreading the incident image light moderately to the observer side to display an image.

Generally, the transmission type screen includes a Fresnel lens sheet, and a lenticular lens sheet. The Fresnel lens sheet is an optical component having the same function as that of a convex lens. That is, the Fresnel lens sheet has a function of changing the direction of the image light outputted from the projector to the observer side to enlarge an optimal viewing range. On the other hand, the lenticular lens sheet has a function of distributing the limited image light outputted from the projector into an observer's observation range effectively.

The lenticular lens sheet includes a plurality of cylindrical lenses arrayed in one direction, and a light absorbing layer disposed in other regions than light-condensing regions through the lenses for absorbing light inputted from the environment surrounding the lenticular lens sheet (hereinafter, the light being referred to as "external light"). When focal points of the lenses are located on an observation surface of the screen, reflection of the external light is reduced without any loss of the image light ideally to thereby suppress lowering of contrast ratio under the bright environment.

Unexamined Japanese Patent Publication No. Hei. 10-260638 has disclosed a lenticular lens sheet having a transparent resin formed as lenses for achieving a wide viewing angle and a bright image, a light absorbing layer patterned, and a diffusing layer having a thickness of from 20 to 500 μm and laminated between the transparent resin and the light absorbing layer.

Incidentally, a direct-vision liquid-crystal display device using TN (Twisted Nematic) liquid crystal or the like generally has viewing angle dependence in which luminance or chromaticity varies in accordance with the direction of observation. On the other hand, Unexamined Japanese Patent Publication No. Hei. 10-39769 has described an optical member which can eliminate the view angle dependence and reduce reflection of external light to thereby suppress lowering of contrast ratio under the bright environment when the optical member is disposed in front of a liquid-crystal display device.

The optical member is provided as a micro lens array sheet having a transparent substrate, a plurality of micro lenses constituted by fine convex surfaces and arrayed planarly on one surface of the transparent substrate, and a light absorbing layer disposed on the other surface of the transparent substrate and having opening portions located in places corresponding to apices of convex portions of the micro lenses.

Examples of the method for producing lenses of an optical member such as a lenticular lens sheet or a micro lens array sheet applied to a display device include: a method using a mold such as a metal mold, a resin mold or a stamper for transferring the shape of the mold; and a method of forming patterns from a resist material at intervals of a required pitch by photolithography and hot-melting the patterns.

A method using a metal mold for transferring the shape of the mold is most preferred as the method for producing a large-area lens array inexpensively. In this case, a transparent resin such as an ultraviolet-setting resin, a thermosetting resin or a thermoplastic resin is used as the lens material. The refractive index of the practical lens material is in a range of from about 1.48 to about 1.66.

FIG. 21 is a graph showing the relation between luminance and viewing angle characteristic in accordance with the refractive index n of a lens. FIG. 21 shows results of calculation in the case where rays of parallel light are incident on a hemispherical lens. In FIG. 21, the horizontal axis shows an emission angle (viewing angle), and the vertical axis shows a relative value of luminance.

As the refractive index n of a lens increases, the difference between luminance in a frontal direction (at an emission angle of 0 degrees) and luminance in an oblique direction decreases so that the viewing angle is widened.

If "At Panels session 1.5.2.B" in "TCO (The Swedish Confederation of professional Employees) 99 requirement" is now noticed as a standard for display devices, TCO 99 cannot be satisfied even in the case where the refractive index of a lens is 1.7, in accordance with the estimation. That is, an optical member capable of achieving a sufficient viewing angle cannot be obtained by use of only the refracting function of a lens using a practical lens material. It is therefore necessary to provide a diffusing layer for enlarging the viewing angle.

In the related art, there has been disclosed a lenticular lens sheet having a transparent substrate including lenses formed on one surface, a light absorbing layer, and a diffusing layer laminated between the transparent substrate and the light absorbing layer. In this case, the thickness of the diffusing layer is defined to be in a range of from 20 to 500 μm from the point of view of preventing generation of a hot band and suppressing lowering of light transmittance but there is no particular consideration for display of a high-precision image.

The resolution of an image displayed on a general optical sheet such as a lenticular lens sheet or a micro lens array sheet depends on the pitch of lenses arrayed. As the pitch of lenses decreases, a higher-precision image can be displayed. It is therefore necessary that the pitch of lenses constituting an optical member is selected to be not larger than tens of microns in order to meet higher resolution of an image advanced with the popularization of HDTV (High Definition Television) in the future.

In this case, the following problem may arise if the diffusing layer is not sufficiently thin. FIG. 22 is a partly schematic sectional view of an optical sheet for explaining a problem in the case where the thickness d of the diffusing layer is not sufficiently small compared with the lens pitch.

Image light 2101 incident on an optical sheet is refracted by lenses 2000 so as to be condensed into a diffusing layer 2001. If the diffusing layer is not sufficiently thin, a part 2100 of light scattered by the diffusing layer is absorbed to a light absorbing layer 2002 to thereby cause a problem that transmittance is reduced.

On the other hand, it may be conceived that opening portions 2003 of the light absorbing layer are widened in order to suppress the reduction of transmittance. In this case, however, there arises another problem that lowering of contrast ratio under the bright environment occurs because absorption of external light to the light absorbing layer is reduced. It may be also conceived that the diffusing characteristic of the diffusing layer is reduced in order to suppress the reduction of transmittance. In this case, however, there arises a problem that the viewing angle is narrowed.

When, for example, the thickness of the diffusing layer is selected to be not smaller than 20 μm in the condition that the pitch of lenses is selected to be 50 μm in order to satisfy high-precision image display, there arises a problem that transmittance is reduced or contrast ratio is lowered.

SUMMARY OF THE INVENTION

Under such circumstances, an object of the invention is to provide an optical sheet which can exhibit high transmittance and have a viewing angle even in the case where the pitch of lenses is not larger than tens of microns in order to support high-precision image display and which can achieve high-contrast-ratio display even under the bright environment; and to provide a display device using the optical sheet.

In order to achieve the object, the gist of the invention is as follows. That is, an optical sheet has: a transparent base material; a fine lens array constituted by a plurality of fine unit lenses formed on a front surface of the transparent base material; a diffusing layer formed on a rear surface of the transparent base material opposite to the surface on which the fine lens array is formed; and a light absorbing layer formed on the diffusing layer and including fine opening portions substantially located at focal points of the unit lenses; wherein: the diffusing layer is made of a transparent medium containing transparent fine particles different in refractive index from the transparent medium; and the transparent fine particles have a mean particle size in a particle size range for maximizing a value of Q/R at each of wavelengths in a visible region when Q is a scattering sectional area per transparent fine particle, and R is a radius of each of the transparent fine particles.

Preferably, the transparent fine particles contained in the diffusing layer have a mean particle size in a particle size range for maximizing the value of Q/R at each of wavelengths in a visible region, or in a range which is near the particle size range and in which variation in the value of Q/R due to the wavelengths in the visible region is reduced.

As the value of Q/R increases, the light scattering characteristic of the diffusing layer increases exponentially. Hence, when the diffusing layer is formed in these conditions, required light scattering characteristic can be achieved though the diffusing layer is thinner.

Incidentally, the value of Q/R with respect to particle sizes of the transparent fine particles varies in accordance with wavelengths. Hence, when the mean particle size of the transparent fine particles is selected from a particle size range for maximizing the value of Q/R at wave lengths in a visible region, required light scattering characteristic can be achieved though the diffusing layer is thinner.

Particularly when transparent fine particles are used to have a mean particle size set as a particle size for maximizing the value of Q/R in a wavelength range of from 525 to 575 nm high in relative luminous efficiency, preferably at a wavelength of 550 nm, required scattering characteristic can be achieved by the diffusing layer smaller in thickness because light scattering characteristic actually sensed by the human being increases apparently.

Variation in the value of Q/R in accordance with wavelengths means variation in scattering characteristic in accordance with colors. That is, if a particle size in which the value of Q/R varies widely in accordance with wavelengths is used, there is the possibility that image quality may deteriorate because of variation in color in accordance with the angle of observation.

Therefore, in the optical sheet according to the invention, when the mean particle size of the transparent fine particles is selected to be in a particle size range for maximizing the value of Q/R or in a range which is near the particle size range and in which variation in the value of Q/R in accordance with wavelengths in a visible region is reduced, variation in color in accordance with the angle of observation can be suppressed.

In this manner, in the optical sheet according to the invention, there can be achieved a diffusing layer which is thin but has sufficient scattering characteristic.

When the diffusing layer is thin, there can be achieved an optical sheet which is high in transmittance, small in size of the opening portions of the light absorbing layer and small in reflection of external light even in the case where the pitch of lenses in the fine lens array is reduced in order to satisfy high-precision image display.

In the optical sheet according to the invention, the bottom surface of each of the unit lenses constituting the fine lens array is basically shaped like a hexagon so that the unit lenses are arranged so as to be closest packed. Hence, the area occupied by the unit lenses in the surface of formation of the fine lens array can be increased to thereby achieve higher transmittance.

Further, interior angles of the shape of the bottom surface of each of the unit lenses are all selected to be not lower than 90 degrees, preferably not lower than 100 degrees. Hence, the curvature of lens surfaces in corners of each unit lens and in regions near the corners is prevented from varying widely. Accordingly, the region effectively functioning as a lens can be widened to the utmost to thereby improve transmittance more greatly.

Further, the longitudinal length of the shape of the bottom surface in each of the unit lenses is selected to be larger than the transverse length thereof. Hence, directivity is given to light emitted from the optical sheet, so that the limited image light can be distributed to the observer effectively to thereby enhance luminance.

Accordingly, in an image display device using the optical sheet according to the invention, a high-contrast-ratio high-quality image can be obtained with high precision and high luminance at a wide viewing angle because of achievement of low-luminance black display even under the bright environment.

Particularly when the optical sheet according to the invention is disposed on the front surface of a direct-vision liquid-crystal display element while a backlight unit for outputting substantially parallel light rays is disposed on the rear surface side of the direct-vision liquid-crystal display element, only light in a limited range near the front of the liquid-crystal display element and permitting good image quality to be obtained can be spread isotropically by the optical sheet. Hence, there can be achieved a liquid-crystal display device for displaying a high-contrast-ratio image in a wide viewing angle range without variation in color tone and without inversion in gradation.

Features and advantages of the invention will be evident from the following detailed description of the preferred embodiments described in conjunction with the attached drawings.

DETAILED DESCRIPTION OF THE PREFERRED EMBODIMENTS

Figure 1:
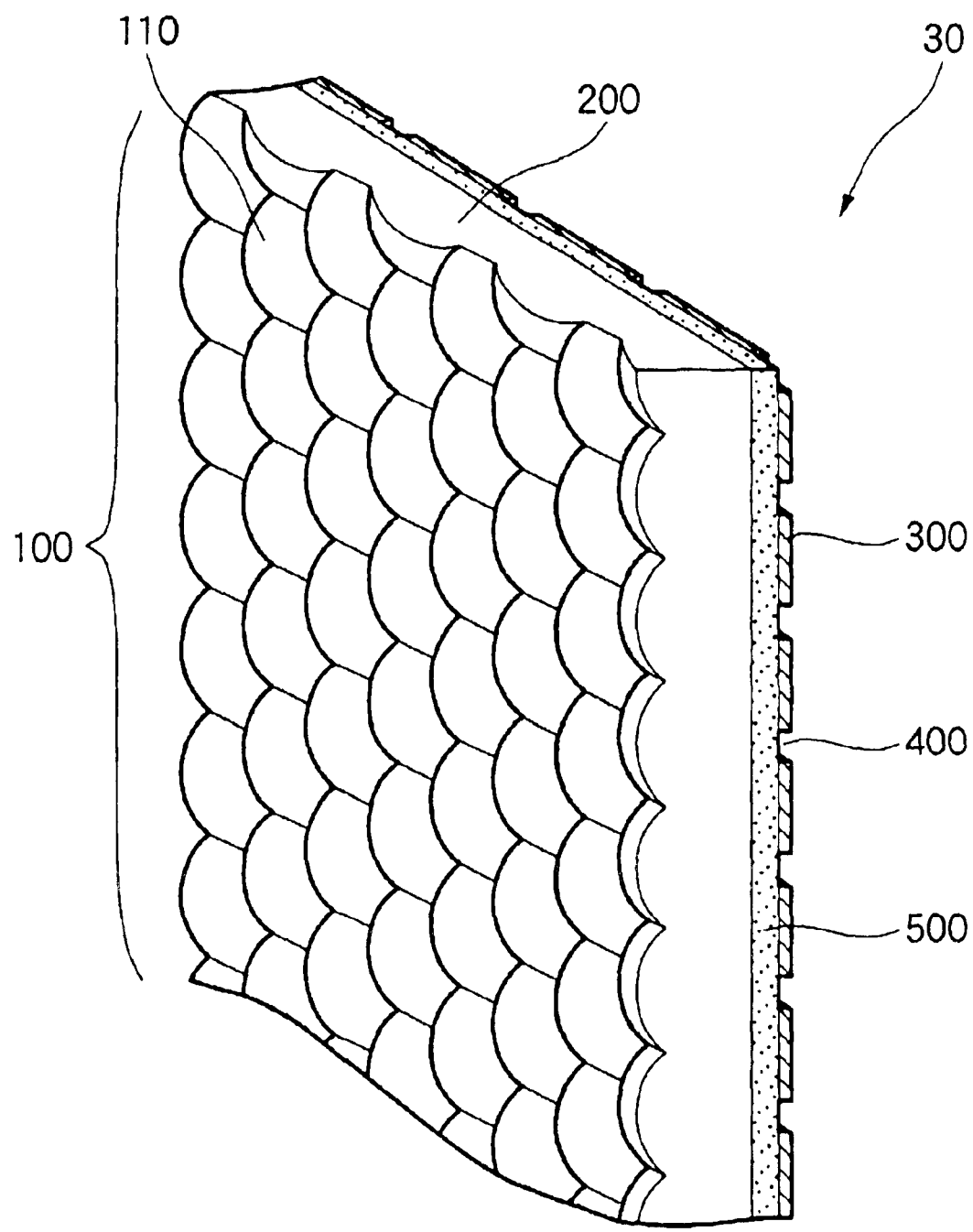
FIG. 1 is a partly perspective view of an optical sheet according to the invention.
Figure 2:
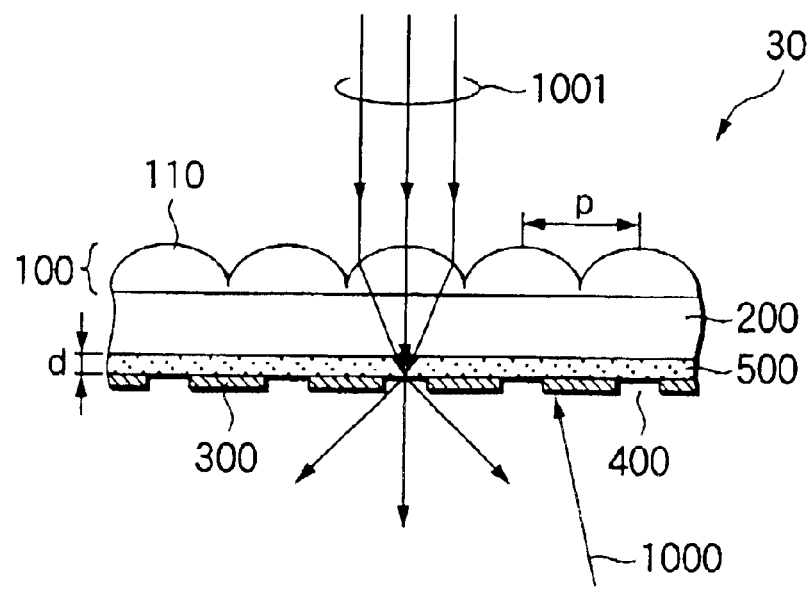
FIG. 2 is a partly sectional view of the optical sheet according to the invention.

FIGS. 1 and 2 are a partly perspective view and a partly sectional view showing an example of an optical sheet according to the invention.

The optical sheet 30 has a planar transparent base material 200, a micro lens array 100 formed on a front surface of the transparent base material 200, a diffusing layer 500 formed on a rear surface of the transparent base material 200, and a light absorbing layer 300 laminated to the diffusing layer 500. The light absorbing layer 300 has opening portions 400 located in positions corresponding to apices of convex portions of the micro lens array 100.

The transparent base material 200 is not particularly limited if it is a material transmitting at least visible light. For example, glass or any kind of plastics can be used as the transparent base material 200. Particularly, a plastic material is preferred from the point of view of mechanical strength, reduction in thickness and weight, processability, etc. Examples of the plastic material may include acrylic-based resin, polycarbonate, polyethylene terephthalate, and triacetyl cellulose.

The micro lens array 100 is constituted by fine convex portions (hereinafter referred to as "unit lenses 110") having lens functions and arranged cyclically on the transparent base material 200. Examples of the micro lens array 100 include: a so-called one-dimensional lens array having unit lenses each of which is constituted by a curved surface expressed in a locus of parallel translation of a curve such as a circular arc as used in a lenticular lens sheet and which are arranged in one direction; and a two-dimensional lens array having unit lenses each of which has a bottom surface shaped like a circle, a rectangle or a hexagon and is constituted by a dome-like curved surface and which are arranged in a plane. In this case, it is necessary that the unit lenses 110 are formed to have focal points located in the diffusing layer 500 so that image light 1001 incident on the unit lenses 110 is condensed into the diffusing layer 500.

For the reason which will be described later, it is preferable from the point of view of improvement in transmittance that the bottom surface of each unit lens has a shape based on a hexagonal shape.

The lens pitch p of the unit lenses 110 is determined on the basis of resolution of the image display device using the optical sheet 30. That is, the lens pitch p of the unit lenses 110 is preferably selected to be not larger than the pitch of pixels in a displayed image, preferably not larger than ¼ of the pitch of pixels in a displayed image in order to keep the resolution of the displayed image high which is supposed to be.

A known method can be used as the method for forming the micro lens array 100. Examples of the method include: a method of transferring a shape of a metal mold having a rough surface corresponding to the shape of the array of unit lenses or transferring a shape of an Ni stamper; and a method of forming patterns at intervals of a required pitch from a resist material by photolithography and hot-melting the patterns to thereby form lenses.

The method using a metal mold or a stamper is preferred from the point of view of productivity. Specifically, there is a method using the transparent base material for forming a micro lens array shape directly on a surface of the transparent base material by a hot pressing method, an extrusion molding method or a roll molding method, that is, a method of integrally molding the micro lens array 100 and the transparent base material 200.

Alternatively, there is a method in which a material selected suitably from an ultraviolet-setting resin, a thermosetting resin and a thermoplastic resin is packed between a metal mold or a stamper and the transparent base material 200 and cured. In this case, a corona discharge treatment or a plasma discharge treatment may be applied to a surface of the transparent base material in order to enhance the adhesion between the transparent base material 200 and the lens material.

Figure 3:
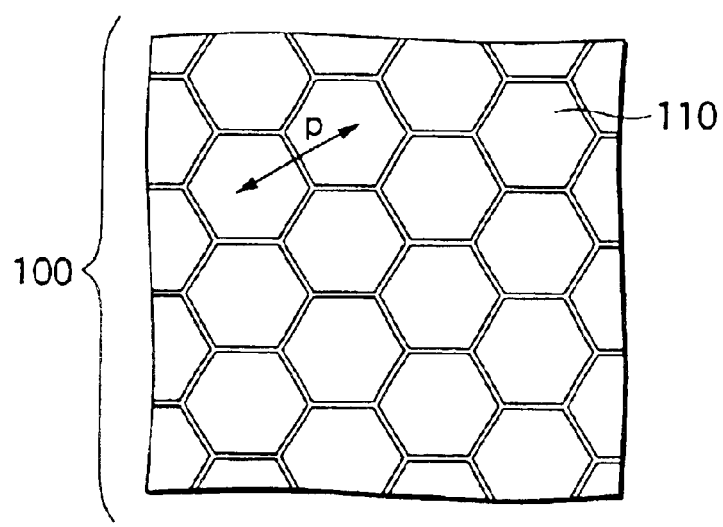
FIG. 3 is a partly front view of a micro lens array in the optical sheet according to the invention.
Figure 4:
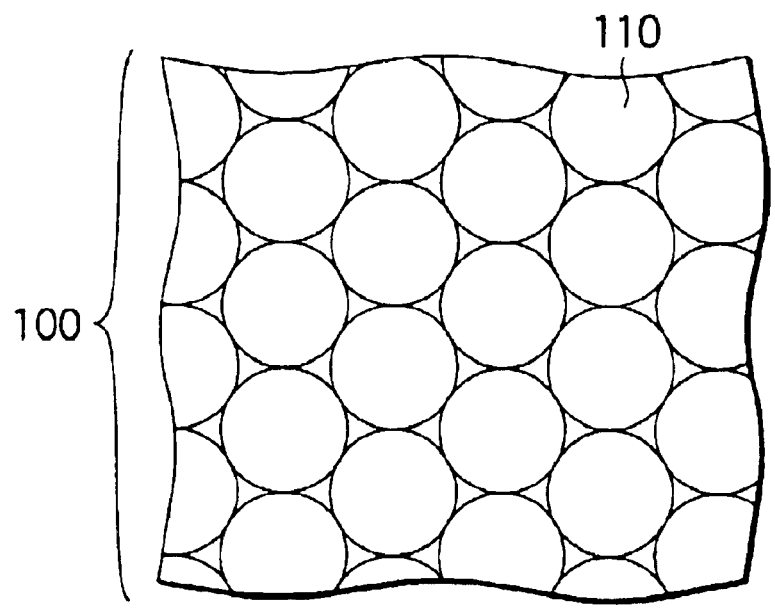
FIG. 4 is a partly front view showing another example of the micro lens array in the optical sheet according to the invention.

The shape of the bottom surface of each of the unit lenses 110 in the micro lens array 100 will be described below. A rectangular shape, a circular shape, an elliptical shape, a hexagonal shape or the like can be used as the shape of the bottom surface of each unit lens 110. To achieve a wide viewing angle both in a horizontal direction and in a vertical direction, a shape such as a circular shape, an elliptical shape, a hexagonal shape, or a rectangular shape may be preferably used because the bottom surfaces of the unit lenses 110 can be arranged two-dimensionally. To particularly achieve an isotropic viewing angle in all azimuths, the bottom surface of each unit lens 110 may be preferably shaped like a circle or an equilateral hexagon. FIG. 3 is a partly front view of the micro lens array 100 in the case where the bottom surface of each unit lens 110 is shaped like an equilateral hexagon. FIG. 4 is a partly front view of the micro lens array 100 in the case where the bottom surface of each unit lens 110 is shaped like a circle.

If the area not occupied by the unit lenses 110 in the surface for formation of the micro lens array 100 in the optical sheet is large, the transmittance of the optical sheet is reduced for the following reason.

That is, light which is a part of image light provided from the surface for formation of the micro lens array 100 in the optical sheet and which is incident on regions where the unit lenses 110 are absent, passes through the diffusing layer 500 directly without receiving any the action of the unit lenses 110 and reaches the light absorbing layer 300. Because the light is absorbed to the light absorbing layer 300, loss occurs. Hence, it is very important for improvement of transmittance that the ratio of the area occupied by the unit lenses to the area of the surface for formation of the micro lens array 100 is made high to increase the quantity of light which is a part of image light incident on the optical sheet and which is allowed to be condensed into the opening portions 400 of the light absorbing layer by the refracting function of the unit lenses so that the light can pass through the opening portions 400.

From this point of view, it is preferable that the shape of the bottom surface of each unit lens 110 is a hexagonal shape rather than a circular shape. This is because in the case of a hexagonal shape, the unit lenses can be arranged to be closest packed without any gap so that the ratio of the area occupied by the unit lenses to the area of the surface for formation of the micro lens array can be made 100% at maximum ideally.

On the other hand, when the shape of the bottom surface of each unit lens is a circular shape, the ratio of the area occupied by the unit lenses to the area of the surface for formation of the micro lens array is reduced to 90.7% even in the case where the unit lenses are arranged to be closest packed without any gap, so that transmittance is reduced correspondingly by the reduction of the area ratio.

Accordingly, the shape of the bottom surface of each unit lens is preferably a hexagonal shape from the point of view of increasing the ratio of the area occupied by the unit lenses to the area of the surface for formation of the micro lens array.

Figure 5:
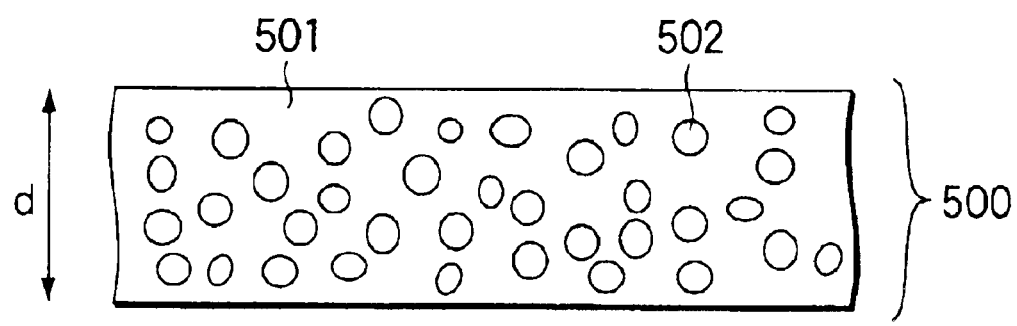
FIG. 5 is a partly sectional view of a diffusing layer in the optical sheet according to the invention.

The diffusing layer 500 will be described below. FIG. 5 is a partly sectional view showing an example of the diffusing layer 500. As shown in FIG. 5, the diffusing layer 500 contains a transparent medium 501 such as a transparent resin, and transparent fine particles 502 mixed with and dispersed into the transparent medium 501. The transparent medium 501 at least exhibits transparency to visible light. The transparent fine particles 502 are different in refractive index from the transparent medium 501 and at least exhibit transparency to visible light.

A thermoplastic transparent resin or a transparent resin having the function of an adhesive agent added to itself can be used as the transparent medium 501. Particularly, an acrylic-based resin may be used preferably in terms of high transparency and durability.

The transparent fine particles 502 are fine particles which are different in refractive index from the transparent medium 501 and which are transparent. Glass fine particles, silica fine particles, melamine-based fine particles, styrene-based fine particles, benzoguanamine-based fine particles or the like can be used as the transparent fine particles. Any shape such as a spherical shape, a ball gravel shape or a rectangular parallelepiped shape can be used as the shape of each of the transparent fine particles 502. Particularly, spherical fine particles capable of scattering light isotropically may be used preferably.

The diffusing layer 500 has a function of scattering light incident on the diffusing layer 500 to thereby enlarge the viewing angle. There is however the possibility that the diffusing layer 500 may cause reduction of transmittance by disturbing the conformation of the positions of the opening portions 400 in the light absorbing layer to light condensed by the unit lenses 110 constituting the micro lens array 100.

Therefore, selecting the thickness d of the diffusing layer 500 to be as small as possible to eliminate the positional unconformity as sufficiently as possible is very effective in improving transmittance and minimizing the opening portions 400 in the light absorbing layer to suppress reflection of external light to thereby achieve high-contrast ratio display under the bright environment.

Incidentally, when light scattering characteristic of the diffusing layer 500 is evaluated on the basis of Anomalous Diffraction (described in H. C. Van de Hulst, Light Scattering by small particles, Wiley, N.Y., 1957), the scattering sectional area σ of the diffusing layer 500 is given by the expression (1):

$$\sigma = 2\pi R^2 \left\{ 1 - \frac{2}{v}\sin(v) + \frac{2}{v^2}[1 - \cos(v)] \right\} \quad (1)$$

in which R is the particle radius of the transparent fine particles, N is the number density of the transparent fine particles, d is the thickness of the diffusing layer, and Δn is the refractive index difference between the transparent medium and the transparent fine particles.

On the other hand, v and k are given by the expressions (2) and (3):

$$v = 2kR\Delta n \quad (2)$$

$$k=2\pi/\lambda \quad (3)$$

$\lambda$ is the wavelength of light made incident on the diffusing layer 500. The scattering sectional area Q per transparent fine particle is given by the expression (4):

$$Q=\sigma/\pi R^2 \quad (4)$$

Assuming now that the strength of scattering is proportional to $e^{\sigma Nd}$, then the strength of scattering by the diffusing layer independently of the thickness d of the diffusing layer may be evaluated on the basis of the value of Q/R given by the expression (5). Incidentally, N is the number density of the transparent fine particles.

$$\sigma Nd \propto Q\pi R^2 R^{-3} d = Q\pi d/R \quad (5)$$

Figure 6:
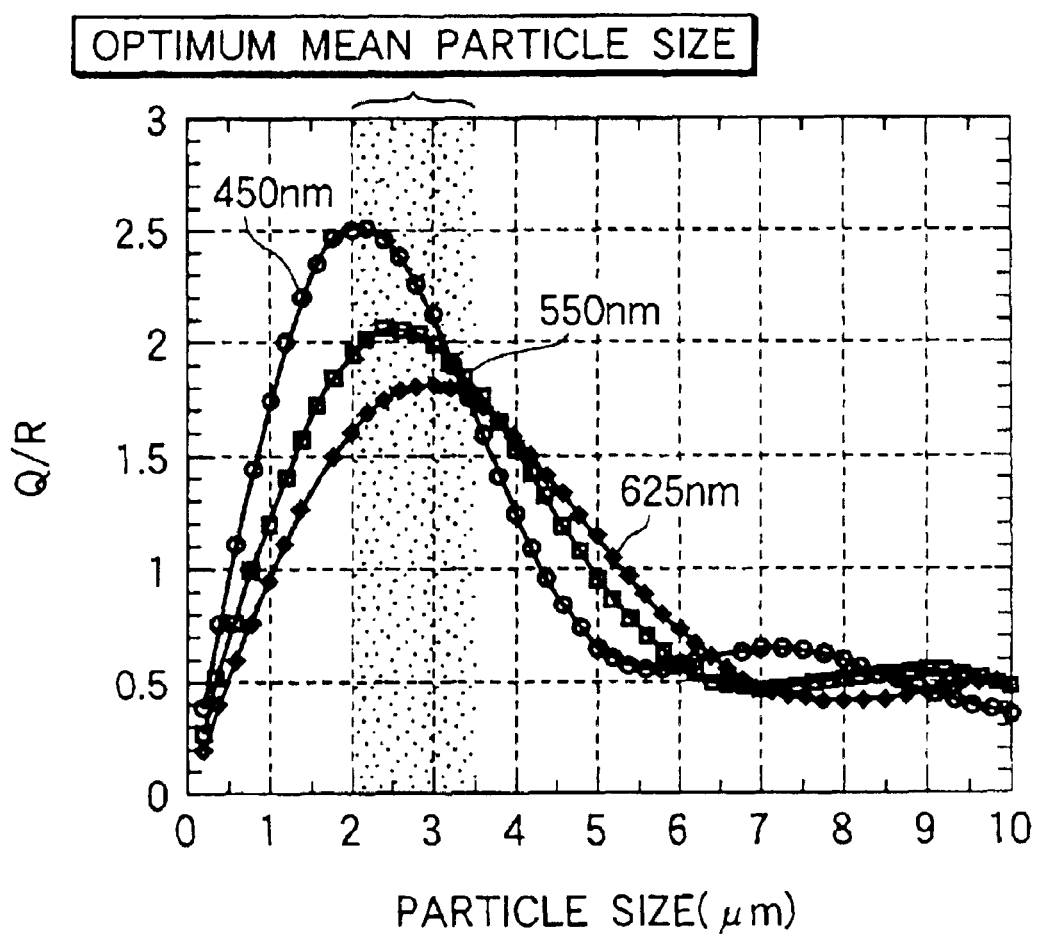
FIG. 6 is a graph showing the relation between the particle size of transparent fine particles and scattering characteristic of the diffusing layer in the optical sheet according to the invention.

The relation between the particle size of the transparent fine particles and Q/R will be described below. FIG. 6 is a graph showing the relation between the particle size of the transparent fine particles in the diffusing layer of the optical sheet according to the invention and scattering characteristic.

FIG. 6 shows the relation between the particle size of the transparent fine particles and Q/R with respect to each of wavelengths of 450 nm, 550 nm and 625 nm regarded as red, green and blue which are light's three primary colors in the case where the diffusing layer 500 satisfies $\Delta n=0.1$ (the refractive index of the transparent fine particles is 1.57 and the refractive index of the transparent medium is 1.47).

The light scattering characteristic of the diffusing layer increases exponentially as the value of Q/R increases. To obtain required light scattering characteristic in a thinner diffusing layer, it is therefore very important to use transparent fine particles having a mean particle size in a range including a particle size for maximizing the value of Q/R and its vicinity. The reason why only the mean particle size is a subject of definition is that preparation of all fine particles having a predetermined particle size is not realistic because the particle size of the fine particles generally varies.

The value of Q/R varies cyclically in accordance with the particle size and takes the maximum value at a first peak viewed in the increasing direction of the particle size. Hence, when transparent fine particles having, as its mean particle size, a particle size for maximizing the value of Q/R are used, a diffusing layer having high light scattering characteristic and thinnest can be achieved.

Incidentally, as shown in FIG. 6, the values of Q/R vary in accordance with wavelengths and the particle size for maximizing the value of Q/R at wavelengths in a visible region has a certain range. Hence, transparent fine particles having a mean particle size in this range may be used preferably.

Transparent fine particles having, as its mean particle size, a particle size for maximizing the value of Q/R in accordance with a wavelength range of from 525 to 575 nm high in relative luminous efficiency and preferably in accordance with a wavelength of 550 nm may be particularly preferably used because higher scattering characteristic can be obtained when observed by the human being.

Incidentally, variation in the value of Q/R in accordance with wavelengths means variation in light scattering characteristic in accordance with colors. That is, in the particle size in which the value of Q/R varies widely in accordance with wavelengths, there is the possibility that image quality may be deteriorated by variation in color in accordance with angles of observation. Therefore, the mean particle size of the transparent fine particles is preferably selected from a particle size range which is as near a particle size for maximizing the value of Q/R as possible and in which variation in the value of Q/R in accordance with wavelengths is reduced in order to prevent image quality from being deteriorated by variation in color.

In consideration of the description, transparent fine particles having a mean particle size in a range of from 2.0 to 3.5 μm, preferably in a range of from 2.5 to 3.5 μm, may be used as the transparent fine particles in the case of $\Delta n=0.1$.

Figure 7:
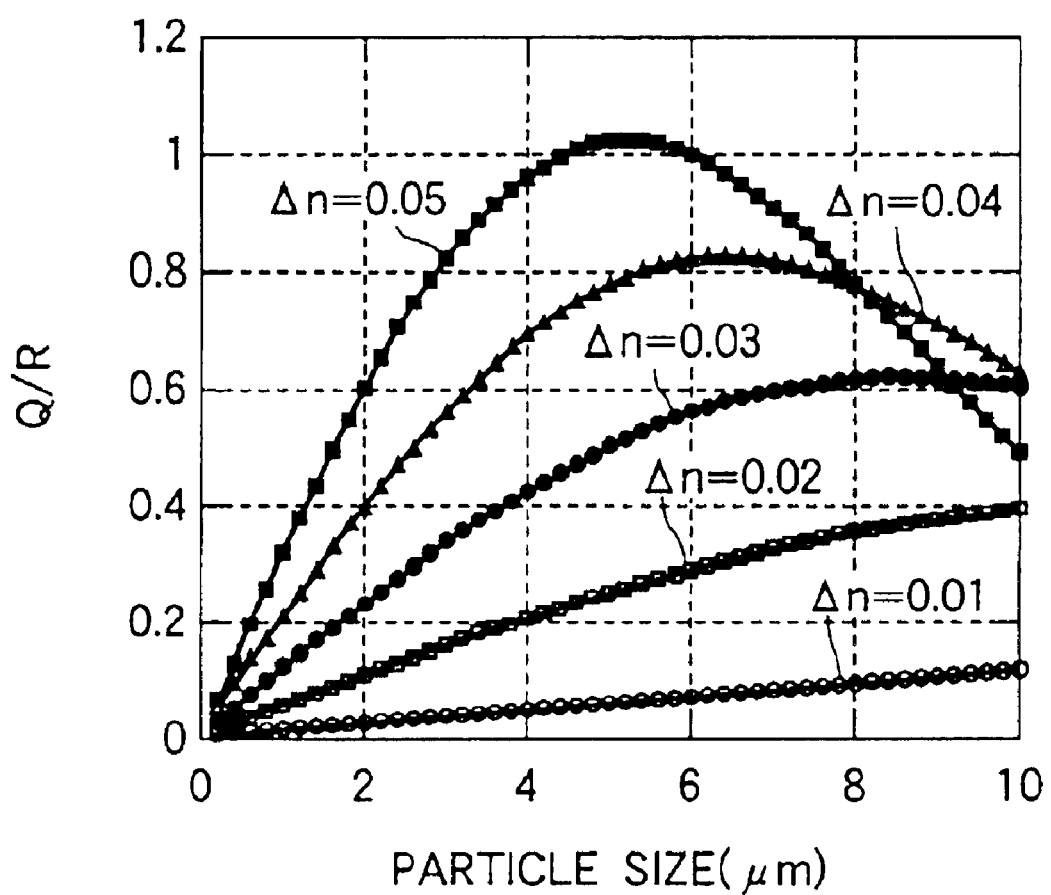
FIG. 7 is a graph showing the relation between the particle size of transparent fine particles and scattering characteristic of the diffusing layer in the optical sheet according to the invention.
Figure 8:
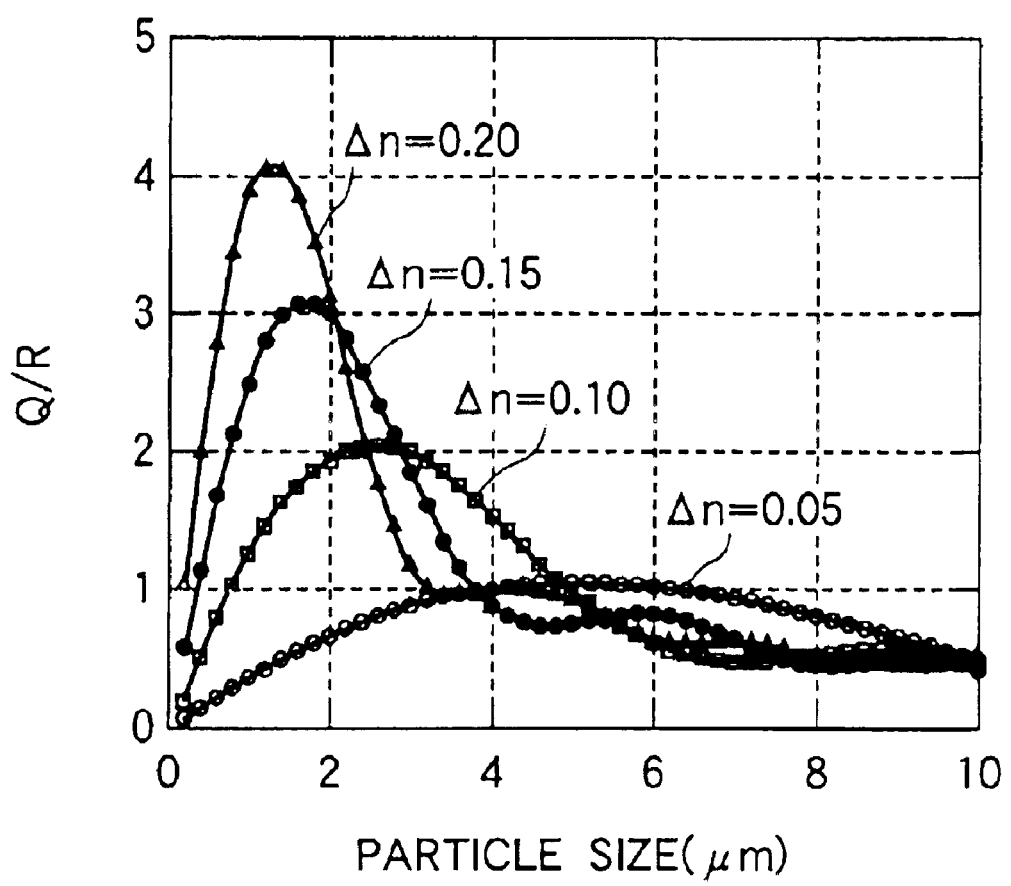
FIG. 8 is a graph showing the relation between the particle size of transparent fine particles and scattering characteristic of the diffusing layer in the optical sheet according to the invention.

The relation between the particle size of the transparent fine particles and the value of Q/R in the case where the refractive index difference $\Delta n$ between the transparent medium and the transparent fine particles changes will be described below. FIGS. 7 and 8 are graphs showing the relation between the particle size of the transparent fine particles and the scattering characteristic of the diffusing layer in the optical sheet according to the invention. FIG. 7 shows the relation between the particle size of the transparent fine particles and the value of Q/R in the case where $\Delta n$ changes in a range of from 0.01 to 0.05 with respect to light with a wavelength of 550 nm. FIG. 8 shows the relation between the particle size of the transparent fine particles and the value of Q/R in the case where $\Delta n$ changes in a range of from 0.05 to 0.20 with respect to light with a wavelength of 550 nm.

As shown in FIG. 7, in the case where $\Delta n$ is not larger than 0.02, the maximum value of Q/R doest not exist when the particle size range of the transparent fine particles is not larger than 10 μm. In the case of $\Delta n=0.05$, the value of Q/R is maximized when the particle size of the transparent fine particles is about 5 μm.

Because adaptation of the optical sheet according to the invention to high-precision image display is taken into consideration, the pitch of lenses in the micro lens array is preferably selected to be not larger than 100 μm, more preferably not larger than 50 μm.

When the lens pitch is selected to be small, it is important that the diffusing layer is made thin in accordance with the lens pitch in order to achieve improvement in transmittance and enhancement in contrast ratio under the bright environment. That is, it is preferable that the thickness of the diffusing layer is as thin as possible compared with the lens pitch. The thickness of the diffusing layer is preferably selected to be not larger than 1/5 of the lens pitch. Hence, the thickness of the diffusing layer may be selected to be smaller than 20 μm, particularly not larger than 10 μm under the condition that sufficient scattering characteristic can be obtained in spite of the thickness of the diffusing layer.

Assuming now that the diffusing layer is 10 μm thick, then it is impossible to form the diffusing layer when the particle size of the transparent fine particles is not smaller than 10 μm. Therefore, $\Delta n$ must be larger than 0.02. To obtain higher light scattering characteristic, it is preferable that at least two transparent fine particles are arranged in a direction of the thickness of the diffusing layer. In this case, $\Delta n$ is preferably selected to be not smaller than 0.05 because the particle size of the transparent fine particles needs to be not larger than 5 μm. Similarly, assuming that the diffusing layer is about 20 μm thick, then $\Delta n$ is preferably selected to be not smaller than 0.03 because the particle size of the transparent fine particles needs to be not larger than 10 μm.

As shown in FIG. 8, when $\Delta n$ increases, the particle size of the transparent fine particles for maximizing the value of Q/R decreases and the maximum value of Q/R increases. That is, when $\Delta n$ increases, higher scattering characteristic can be obtained even in the case where the particle size of the transparent fine particles is smaller.

This means that the larger value of Δn is advantageous because a thinner diffusing layer can be achieved and, at the same time, higher scattering characteristic can be obtained when transparent fine particles having a smaller particle size are used. Reduction in transmittance due to increase in reflection is, however, conspicuous if Δn is larger than 0.2. Therefore, Δn is preferably selected to be not larger than 0.2.

A light absorbing layer 300 is formed on the diffusing layer 500. The light absorbing layer 300 has opening portions 400 located at focal points of the unit lenses 110 constituting the micro lens array 100 and located in corresponding positions near the focal points.

The light absorbing layer 300 at least absorbs light with wavelengths in a visible region. That is, the light absorbing layer 300 has a function of absorbing external light incident on the optical sheet 30 from the environment to reduce reflection of the external light. The light absorbing layer 300 is preferably black. Incidentally, the light absorbing layer 300 can be made of a resin composition containing a known pigment or dye as an additive.

In the light absorbing layer 300, it is necessary to form fine opening portions 400 which are aligned with the unit lenses 110 constituting the micro lens array 100. As a method for forming such fine patterns, there are various techniques in the related art. A suitable technique selected from the various techniques in the related art can be used. Examples of the method for forming such fine patterns include: various kinds of printing techniques such as a screen printing method and an offset printing method; a photolithography technique using a light-sensitive resin such as a resist or a colored resist and a technique using the photolithography technique; and a technique using silver salt, diazo dye or the like.

The unit lenses 110 constituting the micro lens array 100 need to be respectively, optically and accurately aligned with the opening portions 400 formed in the light absorbing layer in accordance with the unit lenses 110. Hence, there is preferably used a method in which opening portions 400 are formed to be self-aligned at focal points of the unit lenses 110 and in corresponding positions near the focal points by exposure to light supposed to have a spread equal to that of image light incident on the optical sheet in practical use or by exposure to substantially parallel light rays similar to the light in the condition that the micro lens array 100 is used as a substitute for a photomask.

Figure 9:
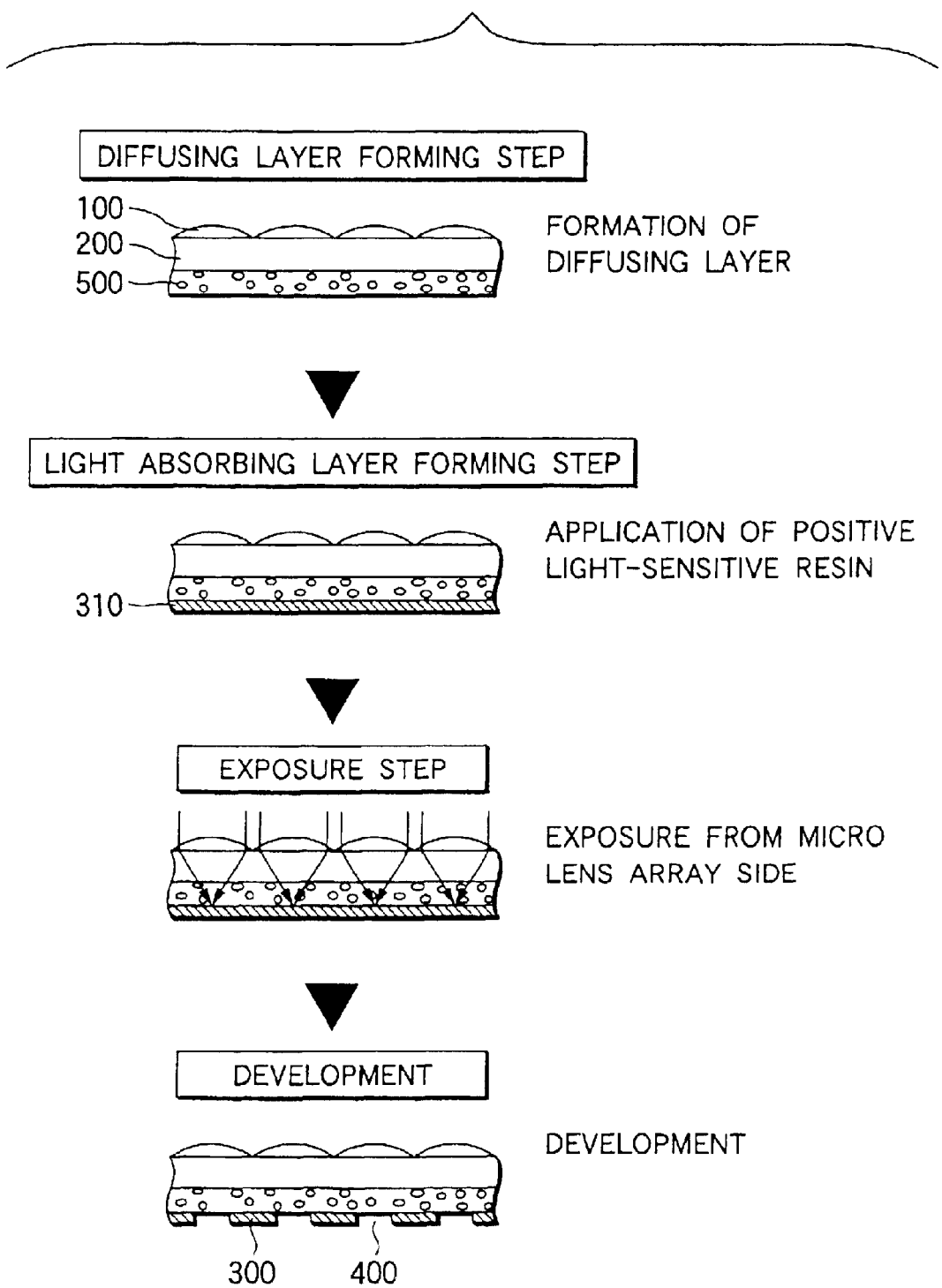
FIG. 9 is an explanatory view showing an example of the method for producing a light absorbing layer in the optical sheet according to the invention and opening portions in the light absorbing layer.

FIG. 9 is an explanatory view showing an example of the method for producing the light absorbing layer in the optical sheet and the opening portions in the light absorbing layer. A diffusing layer 500 is formed on a rear surface of the transparent base material 200 having the micro lens array 100 formed on its front surface, by any one of these methods.

Then, a light-sensitive layer 310 containing a pigment or dye and functioning as a light absorbing layer is formed on the diffusing layer 500. The light-sensitive layer 310 may be made of a positive light-sensitive resin or may be made of a laminate of a light absorbing layer-forming material and a positive light-sensitive resin.

Then, when the light-sensitive layer 310 is irradiated with light supposed to have a spread equal to that of image light incident on the optical sheet in practical use, or irradiated with substantially parallel light rays similar to the light in the condition that the micro lens array 100 is used as a substitute for a photomask, the light-sensitive layer 310 is exposed. On this occasion, portions of the light-sensitive layer 310 corresponding to the focal points of the unit lenses and their vicinity are selectively exposed on the basis of the light-condensing function of the unit lenses constituting the micro lens array 100.

Then, the selectively exposed portions are removed by development to thereby form opening portions 400. The other portions function as a light absorbing layer 300.

Figure 10:
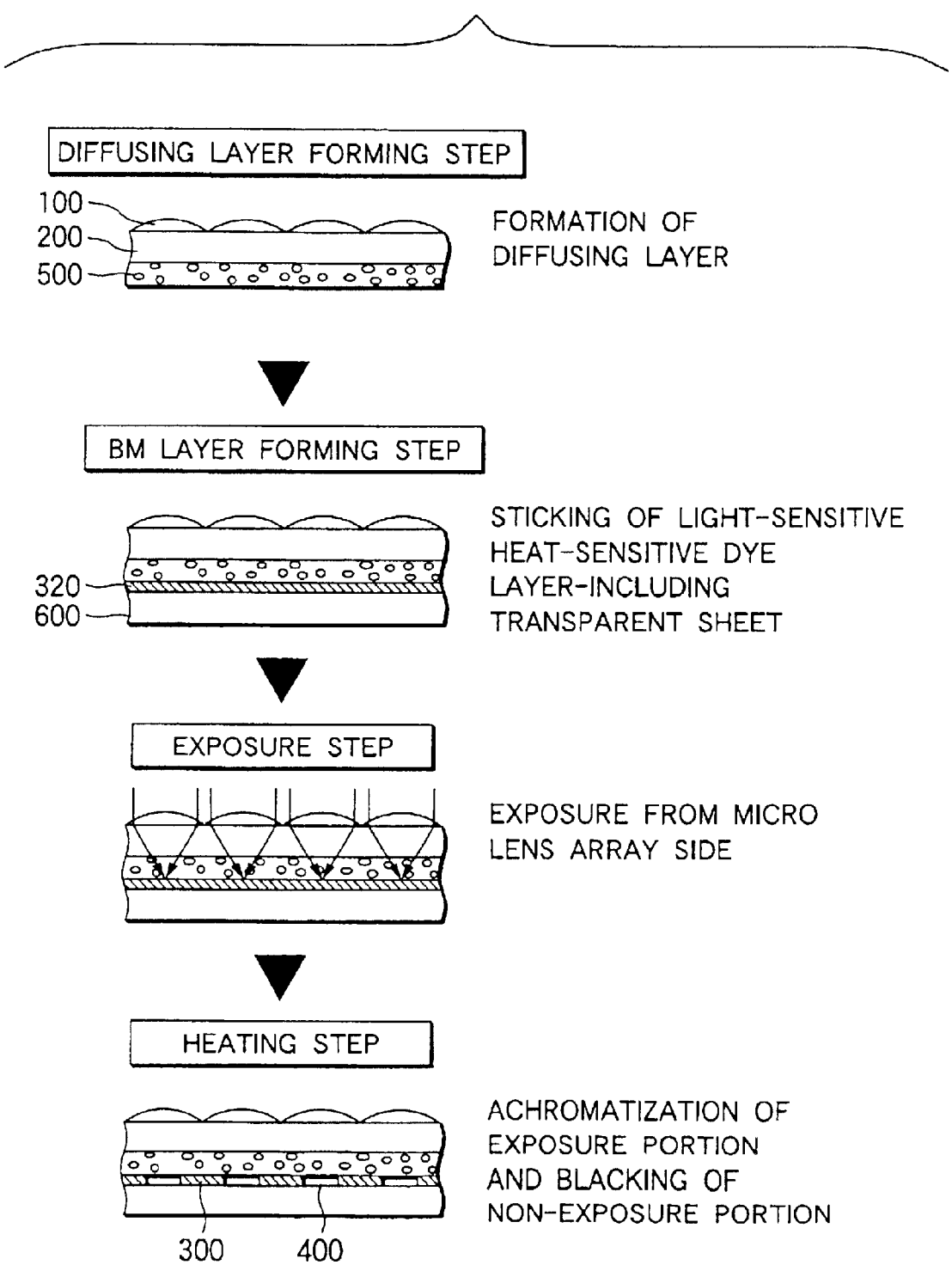
FIG. 10 is an explanatory view showing an example of the method for producing a light absorbing layer in the optical sheet according to the invention and opening portions in the light absorbing layer.

Another producing method will be described with reference to FIG. 10. First, a diffusing layer 500 is formed on a rear surface of the transparent base material 200 having the micro lens array 100 formed on its front surface, by any one of these methods.

Then, another transparent sheet 600 on which a light-sensitive and heat-sensitive layer 320 made of light-sensitive and heat-sensitive dye is formed in advance is stuck onto the diffusing layer 500 so that a surface of the transparent sheet 600 having the light-sensitive and heat-sensitive layer 320 formed thereon is brought into contact with the diffusing layer 500.

The exposed portions of the light-sensitive and heat-sensitive layer 320 are achromatized to exhibit high transmittance. The non-exposed portions of the light-sensitive and heat-sensitive layer 320 are blacked when heated, so that the non-exposed portions function as a light absorbing layer. Diazo-based dye can be used as the material of the light-sensitive and heat-sensitive layer 320.

Incidentally, if an unnecessary layer is present between the light-sensitive and heat-sensitive layer 320 and the diffusing layer 500, the contrast ratio under the bright environment is reduced because of reduction in transmittance and increase in reflection of external light due to enlargement of the opening portions in the light absorbing layer in the same manner as in the case where the diffusing layer is made thick by the thickness of the unnecessary layer.

It is therefore preferable that an acrylic-based adhesive agent is used as the transparent medium contained in the diffusing layer 500 so that the diffusing layer 500 itself can function as an adhesive agent through which the diffusing layer 500 and the light-sensitive and heat-sensitive layer 320 are directly stuck onto each other.

Then, when the light-sensitive and heat-sensitive layer 320 is irradiated with light supposed to have a spread equal to that of image light incident on the optical sheet in practical use, or irradiated with substantially parallel light rays similar to the light in the condition that the micro lens array 100 is used as a substitute for a photomask, the light-sensitive and heat sensitive layer 320 is exposed. On this occasion, portions of the light-sensitive and heat-sensitive layer 320 corresponding to the focal points of the unit lenses and their vicinity are selectively exposed on the basis of the light-condensing function of the unit lenses constituting the micro lens array 100. Then, the light-sensitive and heat-sensitive layer 320 is heated. As a result, the non-exposed portions of the light-sensitive and heat-sensitive layer 320 are blacked so as to function as a light absorbing layer 300 whereas the selectively exposed portions of the light-sensitive and heat-sensitive layer 320 are achromatized and improved in transmittance so as to function as opening portions 400.

Incidentally, in this step, if the heating process is carried out under atmosphere pressure, unreacted nitrogen gas contained in the light-sensitive and heat-sensitive layer may be expanded as gas bubbles with a diameter of several millimeters to cause reduction in transmittance. In this case, generation of gas bubbles can be prevented when the heating process is carried out, for example, under a high pressure of from $2 \times 10^5$ to $5 \times 10^5$ Pa.

In this step, it is unnecessary to use any developer. That is, this step is entirely performed in a dry process. Hence, there is an effect that productivity is high.

Figure 11:
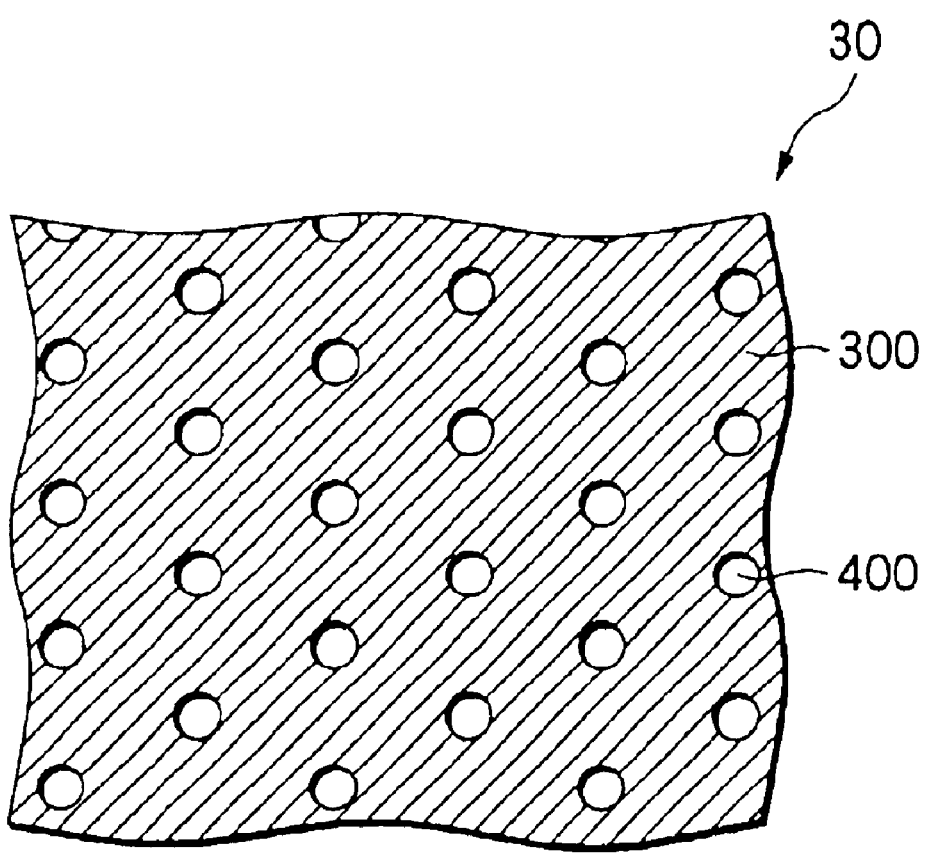
FIG. 11 is a partly plan view, from the light absorbing layer side, of the optical sheet according to the invention.

FIG. 11 is a partly front view, from the light absorbing layer 300 side, of the optical sheet 30 in which the light absorbing layer having fine opening portions is formed by these methods. FIG. 11 corresponds to the case where the shape of the bottom surface of each of the unit lenses 110 is a hexagonal shape as shown in FIG. 3. As shown in FIG. 11, the opening portions 400 in the light absorbing layer are arranged two-dimensionally in accordance with the arrangement of the unit lenses.

Incidentally, from the point of view of distributing limited image light into the observer efficiently, narrowing of the viewing angle of a display device in the vertical direction compared with the viewing angle in the horizontal direction, that is, provision of directivity for enhancing luminance in the frontal direction or in the horizontal direction is effective in enhancing luminance of the display device or in saving electric power consumed by the display device when frontal luminance is kept constant.

Figure 12:
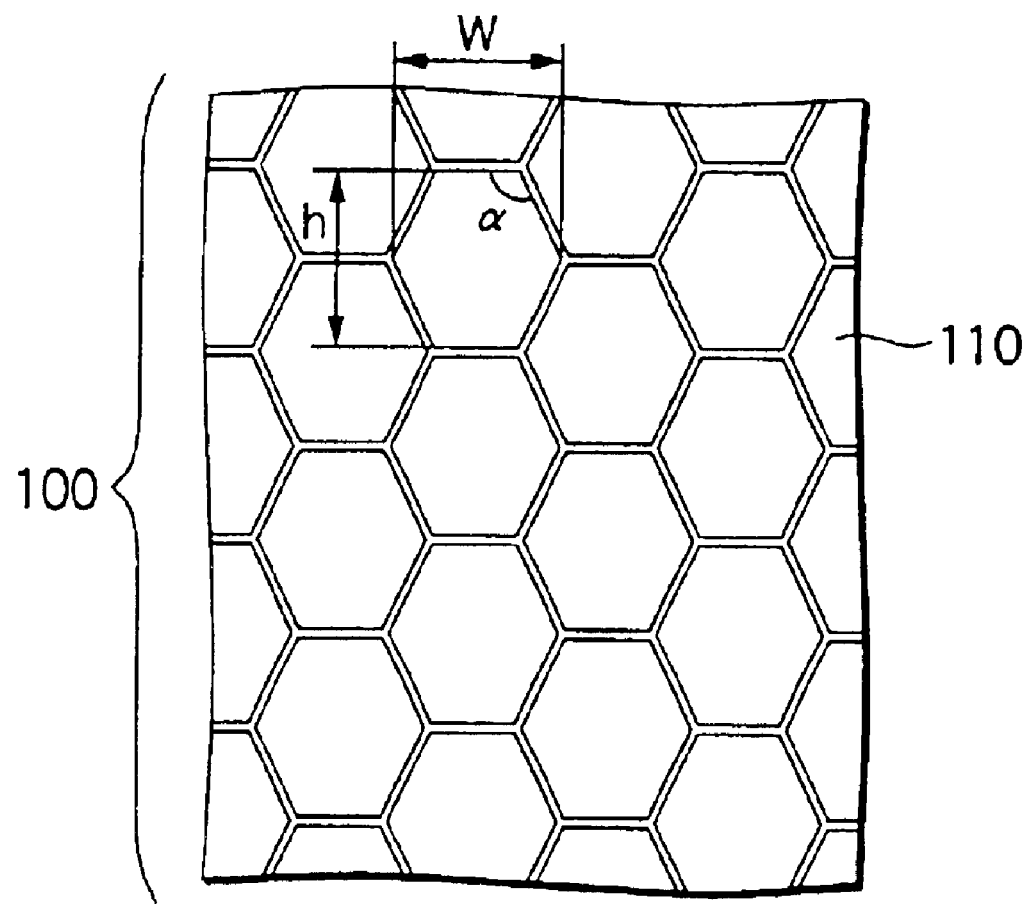
FIG. 12 is a partly front view of a micro lens array in the optical sheet according to the invention.
Figure 13:
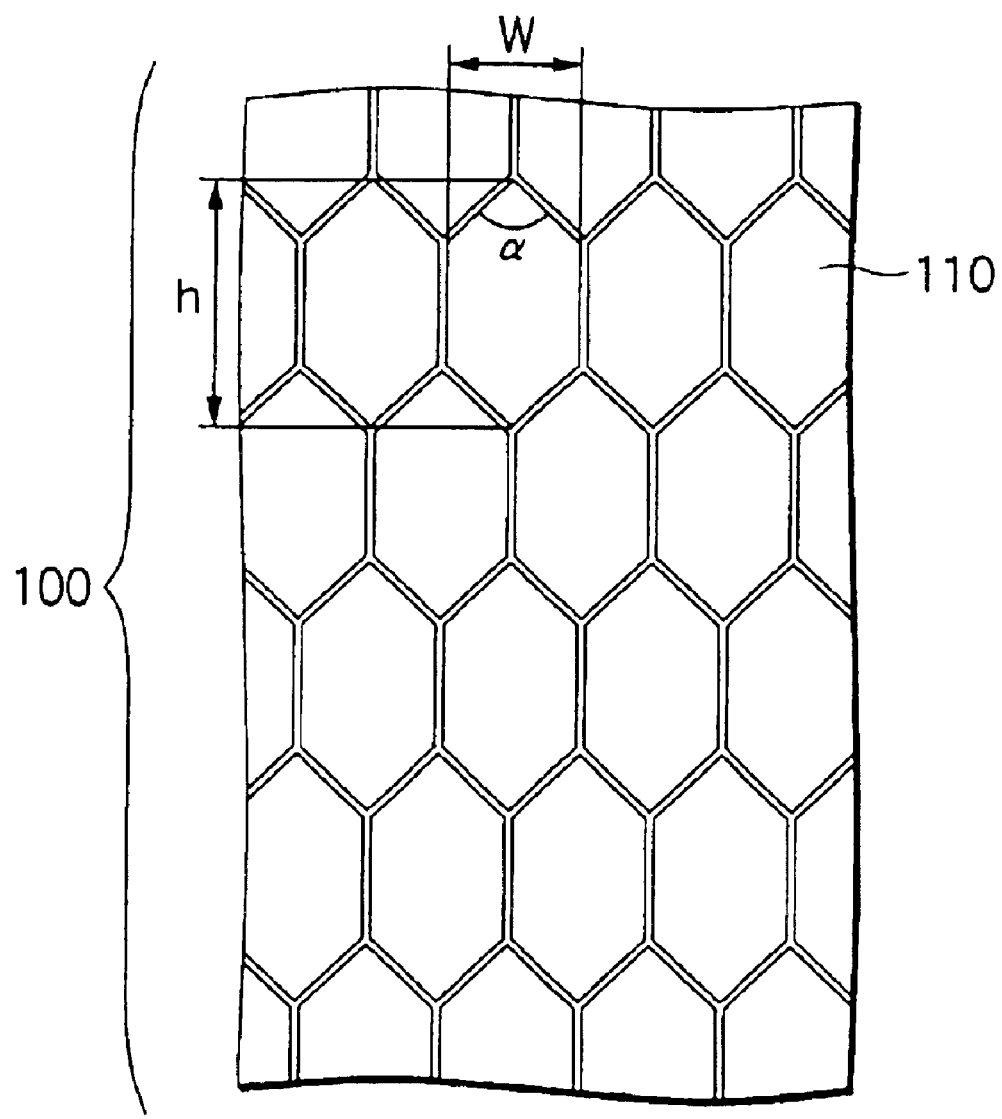
FIG. 13 is a partly front view of a micro lens array in the optical sheet according to the invention.

In this case, as shown in FIGS. 12 and 13, the ratio of the longitudinal length h of the bottom surface of each unit lens 110 to the transverse length w thereof may be changed so that the longitudinal length h is larger than the transverse length w.

Also in this case, the bottom surface of each unit lens may be preferably shaped like a hexagon in order to increase the area occupied by the unit lenses in the surface for formation of the micro lens array.

It is now important that the interior angle $\alpha$ of a corner having the lowest interior angle in all corners in the shape of the bottom surface of each unit lens is not lower than 90 degrees, preferably not lower than 100 degrees. This is because transmittance is reduced if a corner having a low interior angle is present in each unit lens. That is, if a corner having a low interior angle is present in each unit lens, the curvature of the lens surface in the region of the corner and its vicinity is largely different from that in the other region. As a result, focal points are displaced, so that the unit lenses cannot function effectively.

That is, if a corner having a low interior angle is present in the shape of the bottom surface of each unit lens even in the case where the ratio of the area occupied by the unit lenses to the area of the surface for formation of the micro lens array is high, the corner portions cannot function effectively to thereby result in lowering of transmittance.

When the ratio of the longitudinal length h of the shape of the bottom surface of each unit lens 110 to the transverse length w thereof is changed to provide directivity, it is therefore preferable that the shape of the bottom surface of each unit lens is deformed not by pulling the corner portions of the shape but by pulling the side portions of the shape as shown in FIG. 12.

This is because transmittance is improved when the shape of the bottom surface of each unit lens is deformed by pulling the side portions of the shape in the same aspect ratio. That is, when the shape of the bottom surface of each unit lens is deformed by pulling the side portions of the shape in the same aspect ratio, the smallest value of the interior angles of each unit lens becomes larger than that in the case where the shape is deformed by pulling the corner portions. As a result, the portion not functioning as a lens effectively is reduced to result in improvement in transmittance.

Incidentally, in the case where the shape of the bottom surface of each unit lens is a rectangular shape or a triangular shape, the ratio of the area occupied by the unit lenses to the area of the surface for formation of the micro lens array can be made 100% theoretically in the same manner as in the case of a hexagonal shape. In this case, however, the interior angle in the shape of the bottom surface of each unit lens is not higher than 90 degrees, so that each unit lens has a portion not functioning as a lens effectively.

As described above, the shape of the bottom surface in each of the unit lenses constituting the micro lens array is preferably selected as a hexagonal shape in order to maximize the ratio of the area occupied by the unit lenses to the area of the surface for formation of the micro lens array.

When the aspect ratio of each unit lens is changed to provide directivity, it is preferable from the point of view of improvement in transmittance that the unit lens is deformed by pulling its side portions in order not to reduce the interior angle in the shape of the bottom surface of the unit lens as much as possible.

Incidentally, in the actual producing process, the corner portions may be slightly rounded so that the shape of the bottom surface of each unit lens is not accurately a hexagonal shape. Hence, the concept "hexagonal shape" used herein means a basically hexagonal shape, for example, including a hexagonal shape having rounded corners.

Figure 14:
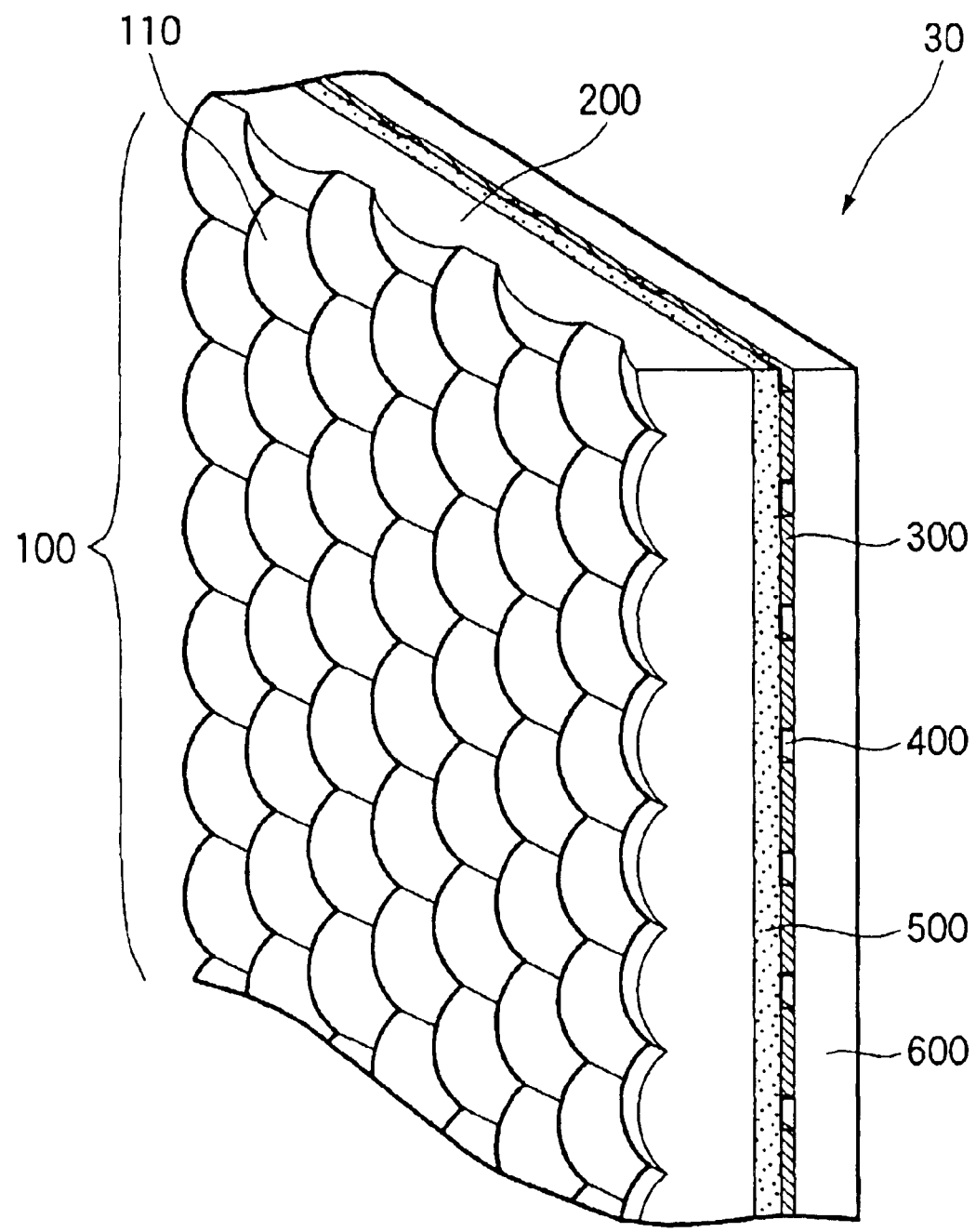
FIG. 14 is a partly perspective view of an optical sheet according to the invention.

Incidentally, there is the possibility that the observer may directly touch the surface of the optical sheet 30 where the light absorbing layer 300 is formed because the surface is disposed on the observer's side. Therefore, as shown in FIG. 14, a transparent sheet 600 may be further stuck onto the light absorbing layer 300 of the optical sheet 30 through a transparent adhesive agent so that the surface can be protected by the transparent sheet 600. Incidentally, a high-molecular film at least exhibiting transparency to visible light can be used as the transparent sheet 600. An acrylic plate having a thickness of several millimeters maybe used as the transparent sheet 600 so as to make the optical sheet itself have stiffness.

An anti-reflection film (not shown) may be further formed on the transparent sheet 600 in order to suppress reflection on the surface of the transparent sheet 600. A known technique may be used for forming the anti-reflection film. For example, there may be used a method of performing multi-coating with some kinds of metal oxides optically designed to be different in refractive index by vapor deposition or a method of applying a low-refractive-index material such as a fluorine compound.

The case where the optical sheet is applied to a display device will be described below. The optical sheet according to the invention is an optical sheet which can be used as a transmission type screen member in a back projection type display device or as a viewing angle enlarging member in a liquid-crystal display device and which is a member of the display device directly observed by the observer. Hence, the optical sheet is an important member whose performance has influence on the image quality of the display device.

As shown in FIG. 2, image light 1001 is incident on the surface of the optical sheet 30 where the micro lens array 100 is formed. The light incident on the micro lens array 100 suffers the refracting function of the unit lenses constituting the micro lens array 100, so that the light is made incident on the diffusing layer 500 while converged into positions corresponding to the opening portions 400 of the light absorbing layer 300. The light incident on the diffusing layer 500 passes through the diffusing layer 500 while scattered, and further passes through the opening portions 400 of the light absorbing layer 300 to the observer's side.

On this occasion, the image light 1001 passing through the optical sheet 30 suffers the scattering function of the diffusing layer 500 as well as the refracting function of the unit lenses, so that a wider viewing angle can be achieved.

Even in the case where the diffusing layer 500 has a small thickness of about several microns, sufficient scattering characteristic can be obtained. Hence, even in the case where the lens pitch of the micro lens array has a small value of tens of microns to meet high-precision display, the size of each of the opening portions 400 in the light absorbing layer 300 can be made small without sacrifice of transmittance.

For this reason, a large part of external light 1000 incident on the optical sheet from the environment is absorbed to the light absorbing layer 300, so that dark black can be displayed even under the bright environment to achieve high-contrast-ratio display.

[Embodiment of Optical Sheet]

FIG. 14 is a partly perspective view of an optical sheet according to this embodiment. First, a photo resist is applied on a planar substrate and exposed and developed through a photomask having patterns formed correspondingly to the shapes of the bottom surfaces of the unit lenses to thereby obtain a photo resist pattern in which fine equilateral hexagonal columns are arrayed. The photo resist pattern is heated to thereby obtain a photo resist pattern in which substantially dome-like fine lens shapes each having a bottom surface shaped like an equilateral hexagon are arrayed on the basis of surface tension at melting. After an Ni film as an undercoat film is first formed on a surface of the photo resist pattern by sputtering and further plated with Ni by about 0.3 mm, the Ni layer is released from the photo resist pattern to thereby obtain an Ni stamper.

Then, a micro lens array shape is directly formed on the transparent base material 200 of a triacetyl cellulose film 50 μm thick initially by a vacuum hot pressing method using the Ni stamper. Thus, an integrally molded piece of the micro lens array 100 and the transparent base material 200 is obtained. By this step, there is obtained the micro lens array 100 in which unit lenses each having a lens height of about 9 μm and having a bottom surface shaped like an equilateral hexagon are closest packed at intervals of a lens pitch p=46 μm.

Then, a diffusing layer about 8 μm thick is formed on a rear surface of the transparent base material 200 opposite to the surface for formation of the micro lens array. A mixture of a transparent medium made of an acrylic-based transparent adhesive agent having a refractive index of 1.47 with benzoguanamine-based transparent fine particles having a mean particle size of 2.5 μm and a refractive index of 1.57 is used as the material of the diffusing layer 500. The adhesive property of the transparent medium is used so that the diffusing layer 500 adheres to the transparent base material 200. The particle size of the transparent fine particles is in a particle size range for maximizing the value of Q/R in accordance with wavelengths in a visible region, so that high light scattering can be obtained even in the case where the diffusing layer 500 is thin.

A light-sensitive material is applied on the diffusing layer 500. The light-sensitive material is exposed to and processed by light supposed to have a spread equal to that of image light incident on the optical sheet in practical use or exposed to substantially parallel light rays similar to the light in the condition that the micro lens array 100 is used as a substitute for a photomask. As a result, there is formed a light absorbing layer 300 having opening portions 400 which are formed so as to be self-aligned at focal points of the unit lenses 110 and in positions near the focal points.

Then, the transparent sheet 600 made of a triacetyl cellulose film is bonded as a protective member onto the light absorbing layer 300 through an acrylic-based transparent adhesive agent.

In this manner, there is obtained an optical sheet in which the lens pitch of the micro lens array 100 is 46 μm to make high-precision image display possible and in which the ratio of the area of the opening portions 400 to the area of the light absorbing layer 300 has a small value of about 20% to achieve low external light reflectance of 5%.

Even in the case where the diffusing layer 500 has a small thickness of 8 μm, sufficient scattering characteristic can be obtained. Hence, there can be obtained an optical sheet which has such a wide viewing angle that the angle for reducing luminance both in the horizontal direction and in the vertical direction to a half of frontal luminance is 60 degrees.

[Embodiment of Back Projection Type Display Device]

Figure 15:
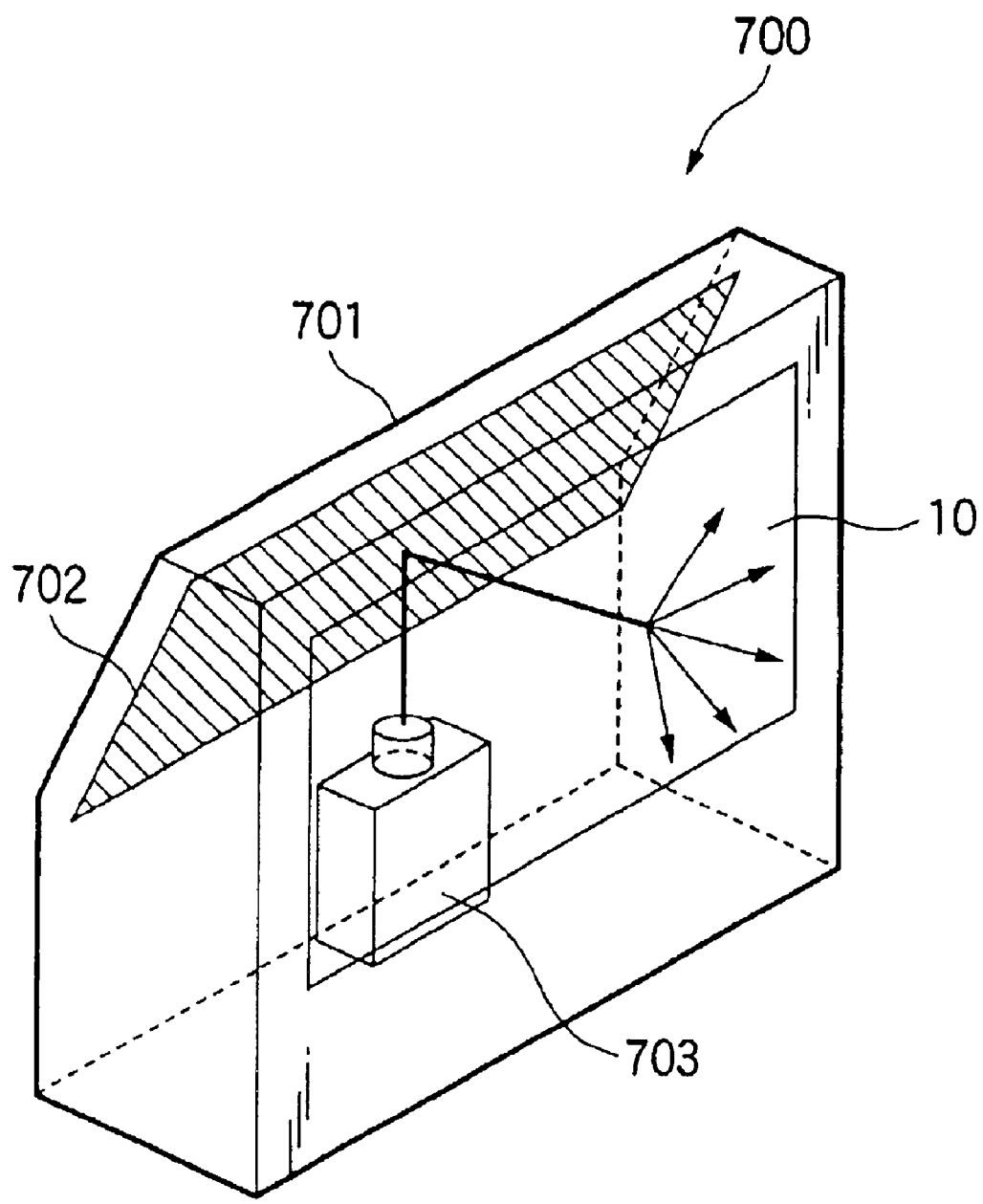
FIG. 15 is a schematic perspective view of a back projection type display device according to the invention.
Figure 16:
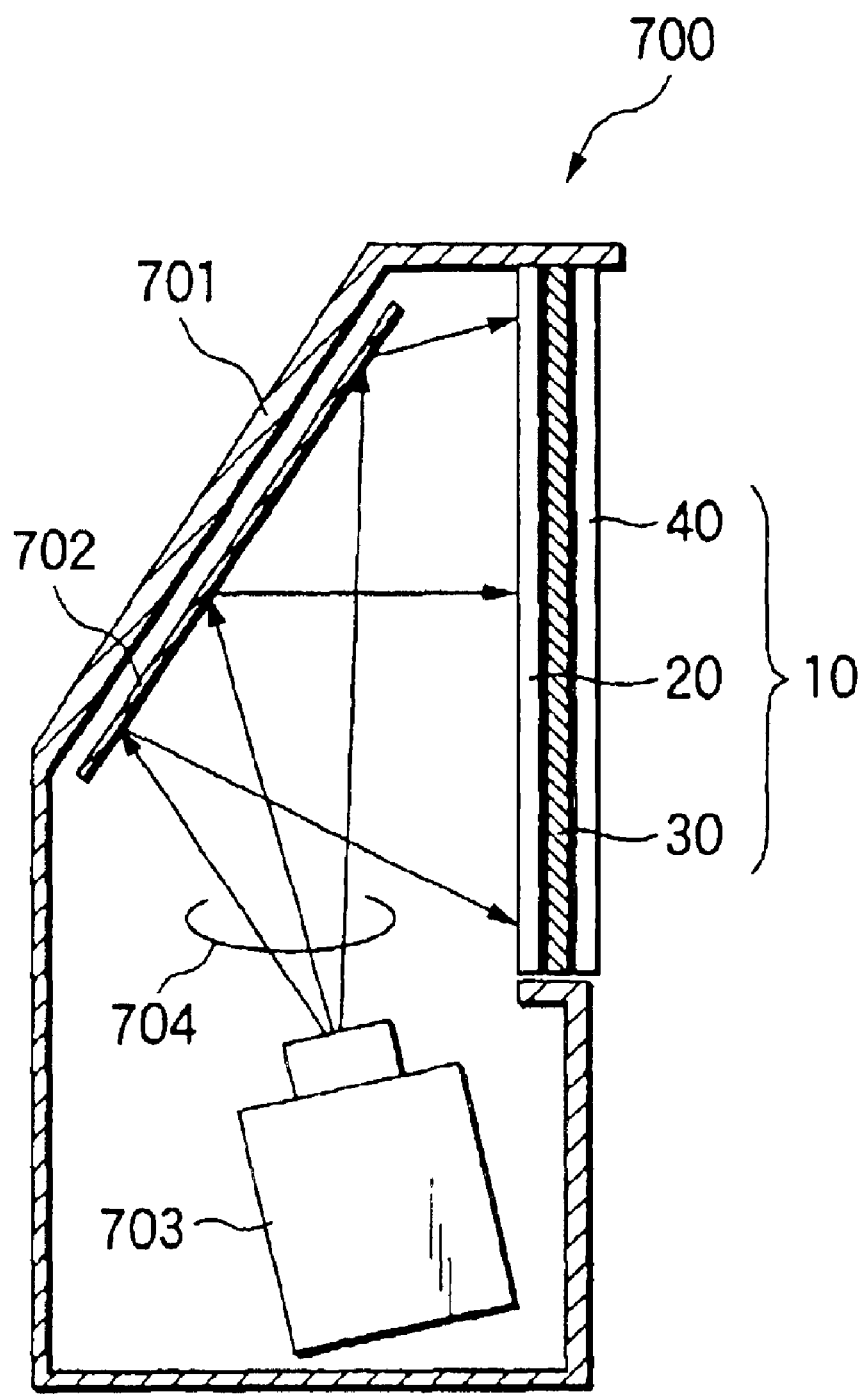
FIG. 16 is a schematic sectional view of the back projection type display device according to the invention.

FIG. 15 is a schematic perspective view of a back projection type display device using the optical sheet according to the invention. FIG. 16 is a schematic sectional view of the back projection type display device. The projection type display device 700 according to the invention has a housing 701, a projector 703 disposed in the housing 701, a reflecting mirror 702 disposed in the housing 701, and a transmission type screen 10. Image light 704 emitted from the projector 703 is projected onto the transmission type screen 10 through the reflecting mirror 702, so that an image is displayed.

A mirror obtained by vapor-depositing a reflective metal such as silver or aluminum on optically isotropic transparent glass can be used as the reflecting mirror 702. A liquid-crystal projector can be used as the projector 703.

Figure 17:
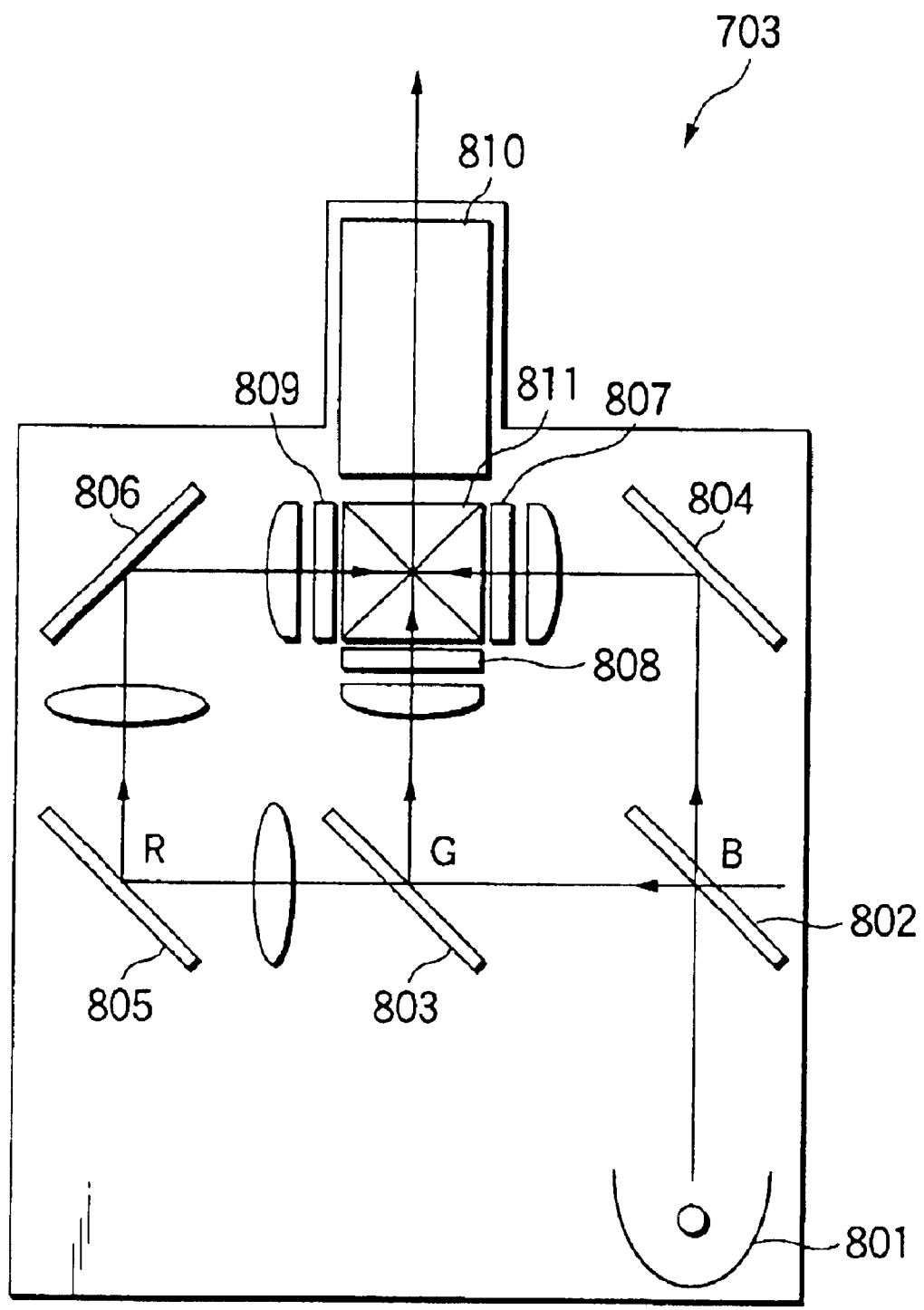
FIG. 17 is a schematic sectional view of a liquid-crystal projector used in the back projection type display device according to the invention.

FIG. 17 is a schematic sectional view of a liquid-crystal projector used in the back projection type display device according to this embodiment. The liquid-crystal projector has a light source 801, liquid-crystal display elements 807, 808 and 809 as two-dimensional optical switching elements, color-separating dichroic mirrors 802 and 803, a color-synchronizing cross-dichroicprism 811, total reflection mirrors 804, 805 and 806, and a projecting lens set 810.

The light source 801 has a reflector shaped like a paraboloid of revolution or an ellipsoid of revolution, and a white light source such as a xenon lamp or a metal halide lamp. When light emitted from the light source 801 passes through an ultraviolet or infrared light cutting filter not shown, ultraviolet or infrared light rays are removed from the light. As a result, the light is formed as white light which travels to the color-separating dichroic mirror 802.

The white light incident on the color-separating dichroic mirror 802 is separated into blue light (B) and other light by the color-separating dichroic mirror 802. The blue light (B) is reflected by the total reflection mirror 804 and then reaches the liquid-crystal display element 807.

On the other hand, the other reflected light than the blue light (B) is further separated into green light (G) and red light (R) by the color-separating dichroic mirror 803. The green light (G) reaches the liquid-crystal display element 808. The red light (R) is reflected by the total reflection mirrors 805 and 806 and then reaches the liquid-crystal display element 809.

TN liquid-crystal display elements can be used as the liquid-crystal display elements 807, 808 and 809. The color light beams incident on the liquid-crystal display devices respectively are spatially modulated in accordance with image information and then emitted from the liquid-crystal display devices respectively. The color light beams modulated by the liquid-crystal display elements respectively enter the color-synchronizing cross-dichroic prism 811. After synchronization, the resulting light is projected onto the transmission type screen 10 through the projecting lens set 810.

Figure 18:
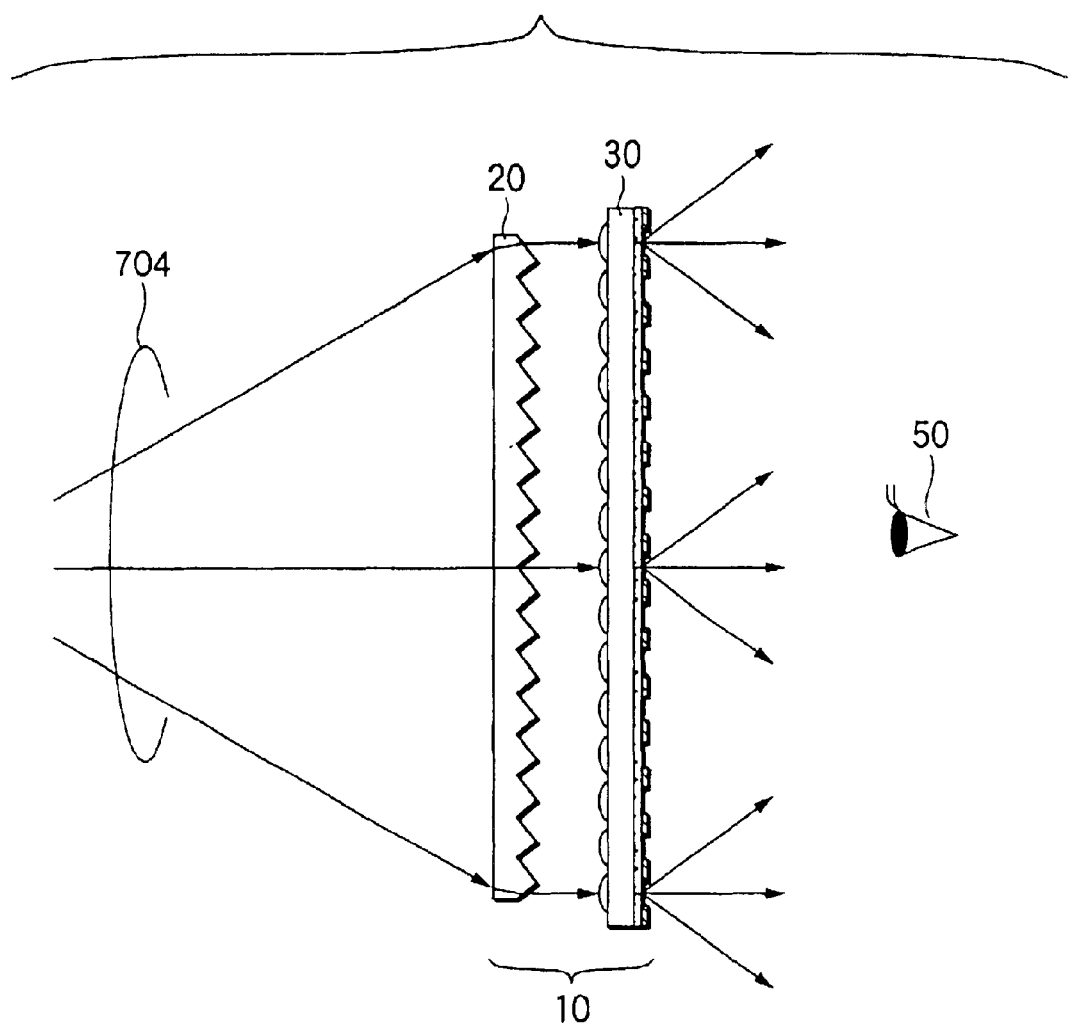
FIG. 18 is a schematic sectional view of a transmission type screen used in the back projection type display device according to the invention.

As shown in FIG. 18, the transmission type screen 10 has an optical sheet 30, and a Fresnel lens sheet 20. The optical sheet 30 and the Fresnel lens sheet 20 are arranged in order of view from the side of the observer 50. Further, as shown in FIG. 16, a transparent acrylic plate 40 about 2 mm thick may be disposed on a front surface side of the optical sheet 30 so that the optical sheet 30 can be protected by the transparent acrylic plate 40.

The Fresnel lens sheet 20 is an optical component which has the same function as that of a convex lens. That is, the Fresnel lens sheet 20 has a function of collimating image light 704 emitted from the projector 703 to thereby change the incidence angle of light incident on the optical sheet 30 to zero degrees or its vicinity.

Figure 19:
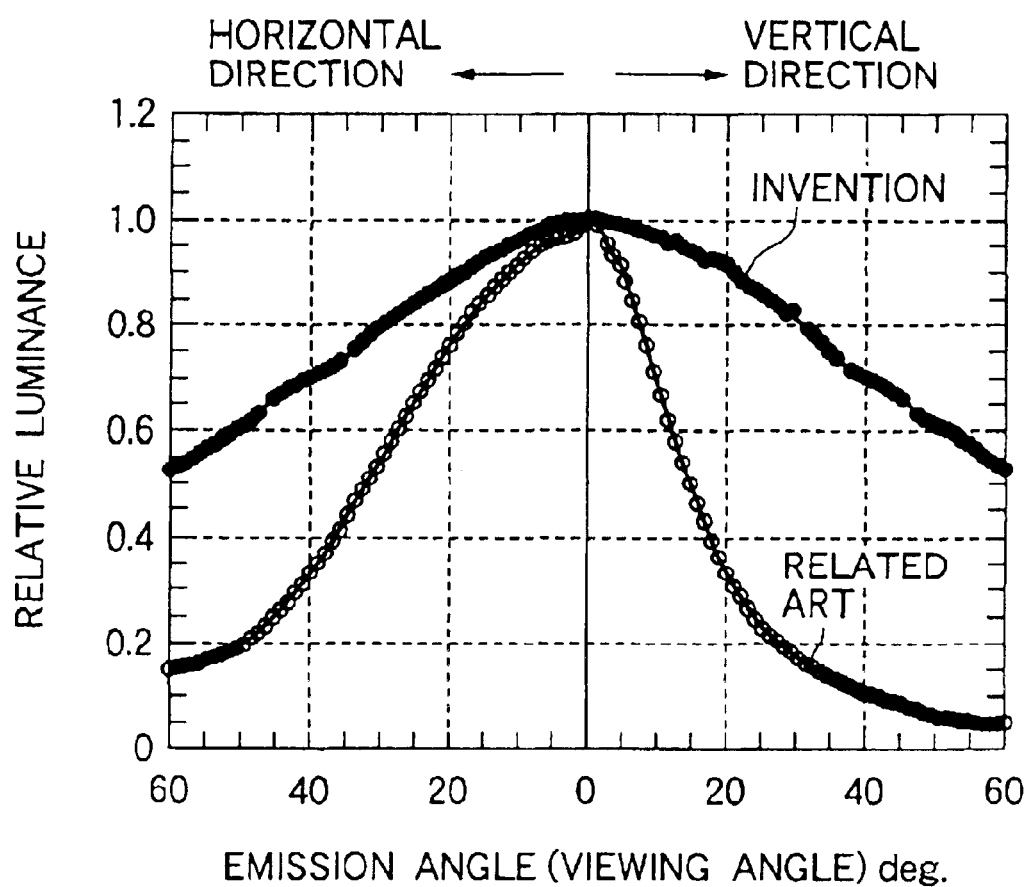
FIG. 19 is a graph showing the relation between luminance and viewing angle characteristic in the back projection type display device according to the invention.

FIG. 19 is a graph showing an example of the relation of luminance and viewing angle characteristic in the back projection type display device according to the invention. FIG. 19 shows results of measurement in terms of the relation of luminance and viewing angle characteristic both in the horizontal direction and in the vertical direction.

In the graph, the vertical axis shows relative luminance standardized with reference to frontal luminance (at an emission angle of 0 degrees), and the horizontal axis shows an emission angle both in the vertical direction and in the horizontal direction. For the sake of comparison, results of measurement in the case where a related-art lenticular lens sheet is used are also shown in FIG. 19.

In the back projection type display device according to the invention, a wide viewing angle both in the horizontal direction and in the vertical direction can be obtained on the basis of the function of the diffusing layer of the optical sheet compared with the case where the related-art lenticular lens sheet is used. Particularly, the viewing angle in the vertical direction becomes as wide as the viewing angle in the horizontal direction because of use of the unit lenses each having a bottom surface shaped like an equilateral hexagon whereas the viewing angle in the vertical direction is narrow in the related-art lenticular lens sheet.

Moreover, low-luminance black display can be achieved even under the bright environment because a large part of external light incident on the transmission type screen 10 is absorbed to the light absorbing layer of the optical sheet 30. Moreover, high-resolution high-quality display can be achieved because the lens pitch of the micro lens array has a small value of tens of microns to display pixels clearly.

The back projection type display device according to the invention has wide viewing angle characteristic because the lens pitch of the optical sheet 30 used as the transmission type screen 10 has a small value of tens of microns, so that the display device is bright even when viewed from any angle. The back projection type display device further has high-precision, high-luminance wide viewing angle characteristic because it has a high effect in reducing unnecessary external light. The back projection type display device further has high-contrast-ratio high-quality image display characteristic because low-luminance black display can be achieved even under the bright environment.

Although description has been made upon the case where a plurality of two-dimensional optical switching elements are used in the projector of the back projection type display device, the invention may be applied also to the case where a so-called single plate projector having one two-dimensional optical switching element is used.

[Embodiment of Direct-Vision Liquid-Crystal Display Device]

Figure 20:
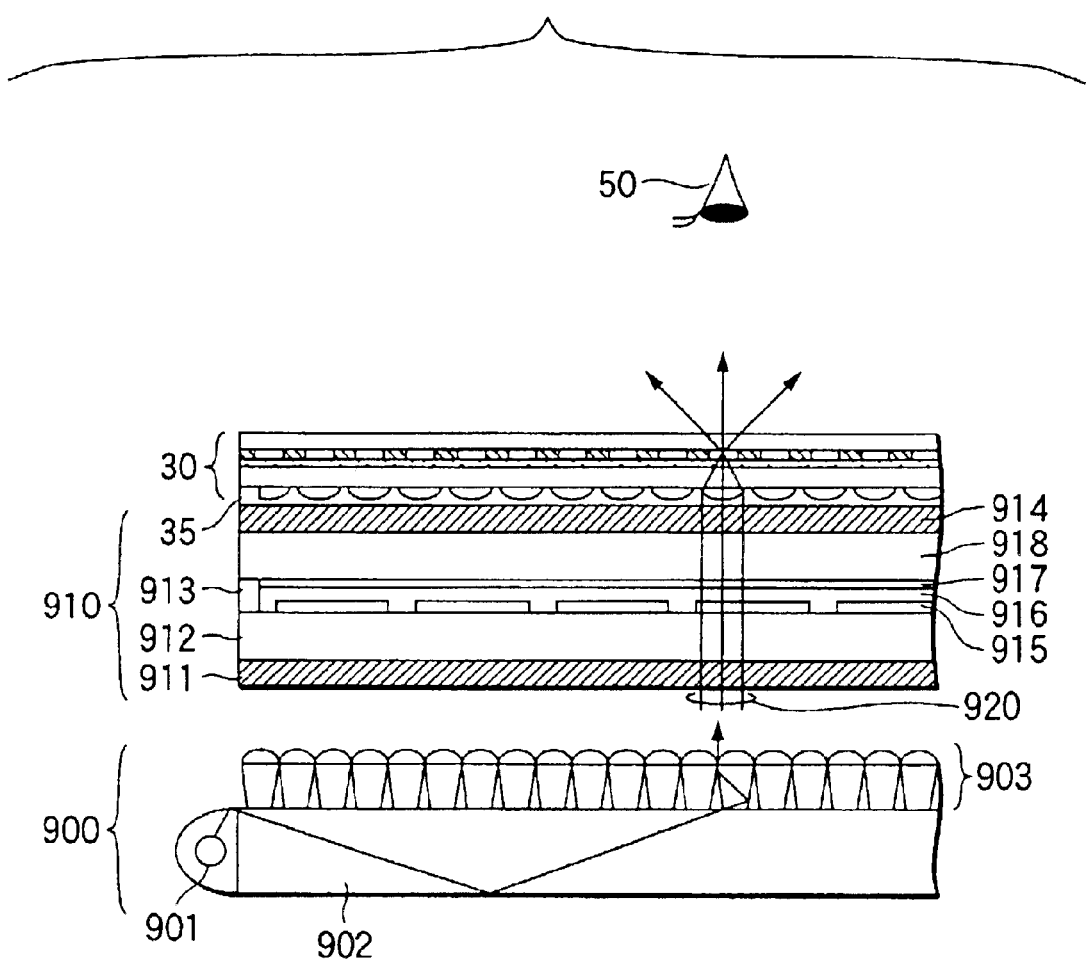
FIG. 20 is a partly schematic sectional view of a direct-vision liquid-crystal display device according to the invention.
Figure 21:
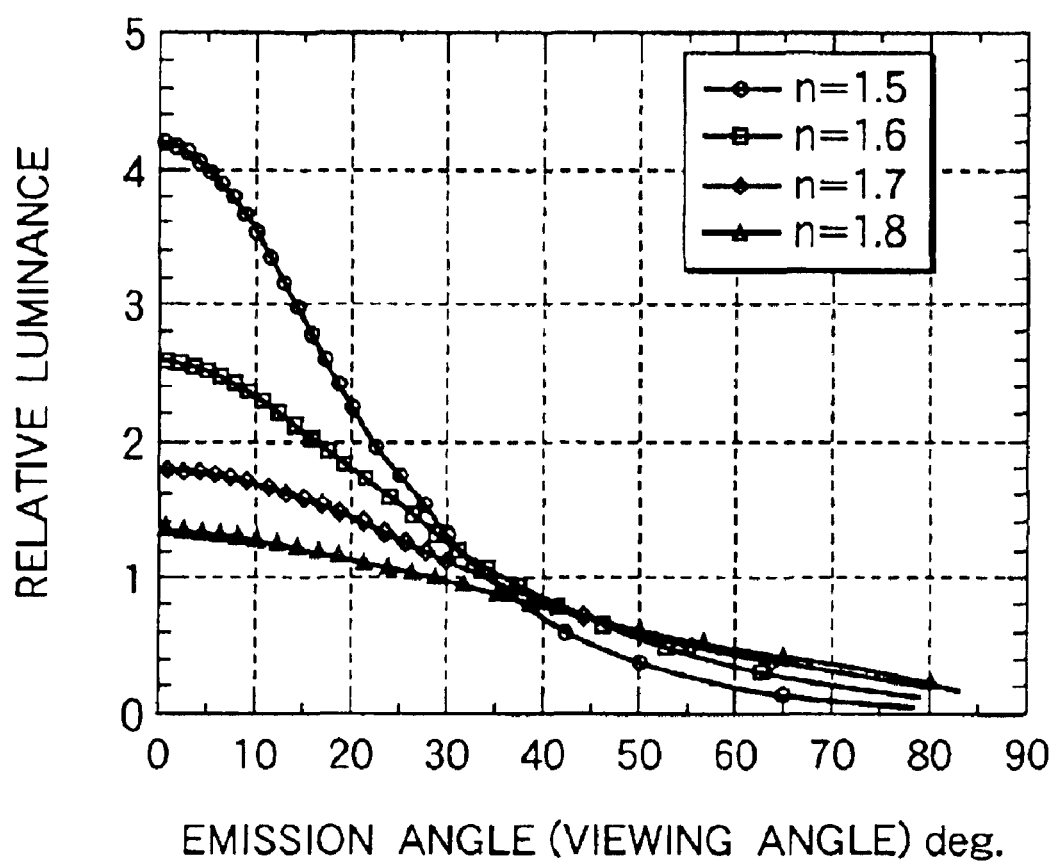
FIG. 21 is a graph showing the relation between luminance and viewing angle characteristic in accordance with the refractive index of each lens.
Figure 22:
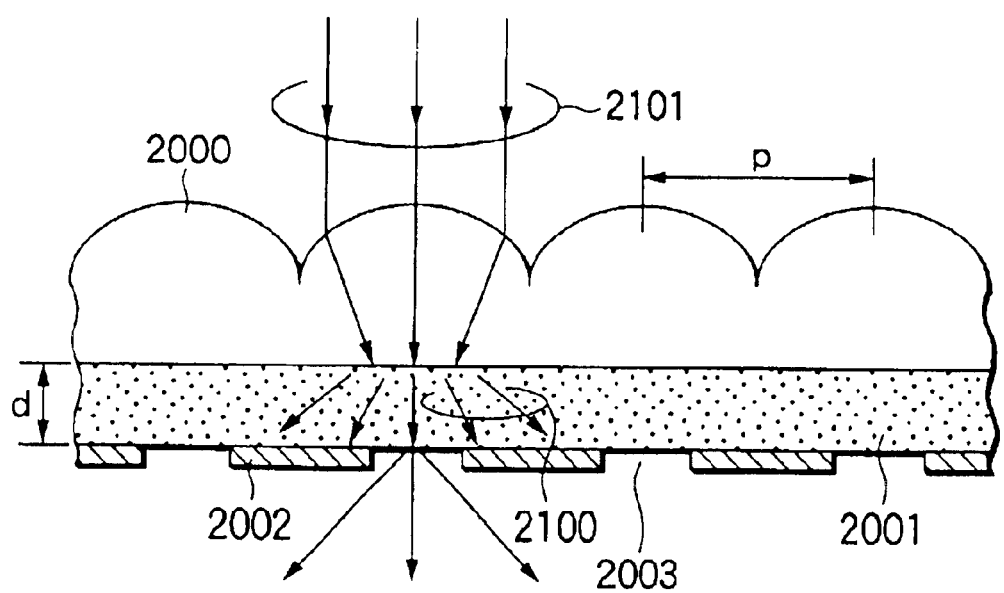
FIG. 22 is a partly schematic sectional view of an optical sheet for explaining problems to be solved by the invention.

FIG. 20 is a partly schematic sectional view of a direct-vision liquid-crystal display device according to this embodiment. The direct-vision liquid-crystal display device has a liquid-crystal display element 910, a backlight unit 900 provided on the back of the liquid-crystal display element 910, and an optical sheet 30 provided in front of a polarizer 914 in the liquid-crystal display element 910.

The backlight unit 900 can output substantially parallel light rays efficiently. For example, a "backlight assembly for electronic optical display" described in International Unexamined Japanese Patent Publication No. Hei. 9-505412 and International Patent Publication WO95/14255 can be used as the backlight unit 900.

The backlight unit 900 used herein has a light source 901 made of a cold-cathode tube, a light pipe 902 made of a transparent acrylic resin, and a collimator element 903. A known element can be used as the collimator element 903. For example, as shown in FIG. 20, a combination of a quadrangular pyramid-shaped micro tapered rod array and a lens array optically coupled with the micro tapered rod array can be used as the collimator element 903 on the light pipe 902. In this case, light guided by the light pipe 902 is propagated through micro tapered rods while totally reflected once or a plurality of times by wall surfaces of the micro tapered rods. After the light is collimated by the refracting function of the lens array, the light emits as substantially parallel light rays from the lens array.

Any other element such as a micro prism sheet or a micro lens array may be used as the collimator element 903. When the backlight unit having such a collimator element is used, illumination light rays which are made substantially parallel in a half-value angle range of ±10 degrees can be obtained.

The liquid-crystal display element 910 has a first transparent substrate 918, a second transparent substrate 912, and a liquid-crystal layer 916. The first transparent substrate 918 has a transparent electrode 917 of ITO (Indium Tin Oxide), and an oriented film of a polyimide-based high-molecular compound. The second transparent substrate 912 has an oriented film not shown, transparent electrodes 915 for forming pixels, and switching elements such as wiring and thin-film transistors not shown but connected to the transparent electrodes 915. The liquid-crystal layer 916 is made of nematic liquid crystal which is enclosed between the two transparent substrates 912 and 918 connected to each other through a sealing agent 913 and which is positive in induced anisotropy.

In the liquid-crystal display element 910, the oriented films applied on the two transparent substrates 912 and 918 respectively are rubbed to form a so-called TN liquid-crystal display element in which the major axes of liquid-crystal molecules in the liquid-crystal layer 916 are continuously twisted by 90 degrees between the two transparent substrates.

Polarizers 911 and 914 are disposed on the rear surface side of the second transparent substrate 912 and on the front surface side of the first transparent substrate 918 respectively in the liquid-crystal display element 910 so that linearly polarized light beams perpendicular to each other are transmitted through the polarizers 911 and 914 respectively. A plate having a stretched film of polyvinyl alcohol formed to have a polarizing function by absorbing iodine to the stretched film, and TAC (TriAcetyl Cellulose) protective layers applied on opposite surfaces of the stretched film is used as each of the polarizers 911 and 914. Each of the polarizers 911 and 914 is bonded to corresponding one of the transparent substrates 912 and 918 through an acrylic-based adhesive agent.

An optical sheet 30 is disposed on the front surface of the liquid-crystal display element 910. An optical sheet described in the "Embodiment of Optical Sheet" is used as the optical sheet.

The bonding of the optical sheet 30 and the liquid-crystal display element 910 maybe fixed by an adhesive agent 35 applied in a frame shape to surround the circumferential edge portion of the liquid-crystal display element 910. Particularly, the liquid-crystal display element 910 and the optical sheet 30 may be pressed by a frame not shown so as to be fixed to each other without bonding.

The operation of the direct-vision liquid-crystal display device will be described below. Among light 920 emitted from the backlight unit 900, linearly polarized light transmitted through the polarizer 911 is transmitted through the liquid-crystal layer 916 so as to be made incident on the polarizer 914. On this occasion, the state of polarization of light passing through the liquid-crystal layer 916 varies in accordance with the electric field applied on the liquid-crystal layer 916. Therefore, voltages corresponding to image information are applied to electrodes corresponding to pixels so that an image is formed while the quantity of light transmitted through the polarizer 914 is controlled. The image light transmitted through the polarizer 914 is made incident on the optical sheet 30.

A large part of the light incident on the optical sheet 30 is made incident on the unit lenses constituting the micro lens array. The light incident on the unit lenses is made incident on the diffusing layer while the light is converged into positions corresponding to the opening portions of the light absorbing layer by the refracting function of the unit lenses. The light incident on the diffusing layer passes through the diffusing layer while scattered, and further passes through the opening portions of the light absorbing layer to the observer 50 side.

Generally, the TN liquid-crystal display device has viewing angle dependence. When the TN liquid-crystal display device is viewed obliquely, lowering of contrast ratio, inversion of gradation and change of chromaticity occur. Accordingly, good image quality can be obtained only in a limited angle range near the front direction.

On the other hand, if substantially parallel light rays are used in the exposure process for the optical sheet 30 so that the opening portions are formed in the light absorbing layer so as to be self-aligned, light obliquely incident on the optical sheet 30 is absorbed to the light absorbing layer so that the light cannot reach the observer 50. Hence, among light emitted from the liquid-crystal display element 910, a large part of light having a high incidence angle sufficient to cause lowering of contrast ratio, inversion of gradation and change of chromaticity is absorbed to the light absorbing layer of the optical sheet 30 so that the large part of light cannot be observed.

On the other hand, light in a direction near the front direction in which good image quality can be obtained, that is, light having an incidence angle near to zero degrees is transmitted through the optical sheet and diffused isotropically. As a result, a high-contrast-ratio image can be obtained because no change of chromaticity and no inversion of gradation occur in a wide viewing angle range.

Incidentally, in the liquid-crystal display device according to the invention, the percentage of light in an angle range allowing good image quality to be obtained in the liquid-crystal display element 910 is high because substantially parallel light rays are emitted from the backlight unit 900 toward the liquid-crystal display element 910. At the same time, light-utilizing efficiency is high because light loss in the optical sheet 30 is reduced. Hence, a high-luminance image can be obtained.

That is, in the liquid-crystal display device according to the invention, a high-luminance high-contrast image can be obtained without change of chromaticity and without inversion of gradation in a wide viewing angle range.

Moreover, because the optical sheet 30 has a high effect in reducing external light, low-luminance black display can be achieved even under the bright environment so that a high-contrast-ratio image can be obtained.

When the liquid-crystal display device according to the invention is evaluated, the liquid-crystal display device having a contrast ratio of 80:1 or higher, isotropy and a wide viewing angle is obtained without change of chromaticity and without inversion of gradation in a viewing angle range of ±80 degrees.

Although this embodiment has been described upon the case where a monochrome TN liquid-crystal display element is used as the liquid-crystal display element for the sake of simplifying the drawings, the invention may be applied also to the case where micro color filters are provided on the transparent substrates to form a full-color liquid-crystal display device. The display mode is not limited to the TN mode. A VA (Vertical Aligned) mode, an ECB (Electrically Controlled Birefringence) mode, an OCB (Optically Compensated Bend) mode, an STN (Super Twisted Nematic) mode or the like may be used as the display mode.

A passive matrix drive method as well as an active matrix drive method using switching elements such as thin-film transistors may be used as the drive method.

In the optical sheet according to the invention, the lens pitch of the micro lens array can be reduced to a small value of tens of microns so that high-precision image display can be achieved. On this occasion, a diffusing layer can be provided so that sufficient light scattering performance can be obtained even in the case where the diffusing layer is thin. Hence, the optical sheet can be obtained as an optical sheet wide in viewing angle, high in transmittance, small in size of opening portions of the light absorbing layer and low in external light reflectance.

Further, the image display device using the optical sheet according to the invention is high in precision, high in luminance and wide in viewing angle. Low-luminance black display can be achieved even under the bright environment. Hence, a high-contrast-ratio high-quality image can be obtained.

Further, in the back projection type display device according to the invention, the lens pitch in the optical sheet used as a transmission type screen has a small value of tens of microns. Hence, the display device has such wide viewing angle characteristic that it is bright even when viewed from any angle. Moreover, because reflection of external light is low, high precision, high luminance and wide viewing angle can be obtained. Low-luminance black display can be achieved even under the bright environment. Hence, a high-contrast-ratio high-quality image can be obtained.

Further, in the liquid-crystal display device according to the invention, the optical sheet is disposed in front so that display having no change of chromaticity and no inversion of gradation can be obtained in a wide viewing angle range. Because the optical sheet used is highly effective in reducing reflection of external light, low-luminance black display can be achieved even under the bright environment. Hence, a high-contrast-ratio image can be obtained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical sheet comprising:
   a transparent base material;
   a fine lens array constituted by a plurality of fine unit lenses formed on a front surface of said transparent base material;
   a diffusing layer formed on a rear surface of said transparent base material opposite to said surface on which said fine lens array is formed; and
   a light absorbing layer formed on said diffusing layer and including fine opening portions substantially located at focal points of said unit lenses;
   wherein said diffusing layer is made of a transparent medium containing transparent fine particles different in refractive index from said transparent medium, and
   said transparent fine particles have a mean particle size in a particle size range for maximizing a value of Q/R at each of wavelengths in a visible region when Q is a scattering sectional area per transparent fine particle, and R is a radius of each of said transparent fine particles.

2. An optical sheet according to claim 1, wherein said transparent fine particles have a mean particle size in a particle size range for maximizing a value of Q/R in a wavelength range of from 525 to 575 nm.

3. An optical sheet according to claim 1, wherein said unit lenses constituting said fine lens array are arranged at intervals of a pitch of not larger than 10 $\mu$m, $\Delta$n is in a range of from 0.03 to 0.2 when $\Delta$n is the refractive index difference between said transparent medium and said transparent fine particles, and said diffusing layer has a thickness smaller than 20 $\mu$m.

4. An optical sheet comprising:
   a transparent base material;
   a fine lens array constituted by a plurality of fine unit lenses formed on a front surface of said transparent base material;
   a diffusing layer formed on a rear surface of said transparent base material opposite to said surface on which said fine lens array is formed; and
   a light absorbing layer formed on said diffusing layer and including fine opening portions substantially located at focal points of said unit lenses;
   wherein said diffusing layer is made of a transparent medium containing transparent fine particles different in refractive index from said transparent medium, and
   said transparent fine particles have a mean particle size in one range selected from a particle size range for maximizing a value of Q/R at each of wavelengths in a visible region and a range which is near said particle size range and in which variation in the value of Q/R due to the wavelengths in the visible region is reduced, when Q is a scattering sectional area per transparent fine particle, and R is a radius of each of said transparent fine particles.

5. A back projection type display device comprising:
   a projector including a light source, a two-dimensional optical switching element for modulating light emitted from said light source in accordance with image information to form an optical image, and a projection lens for projecting said optical image while magnifying said optical image; and
   a transmission type screen having a back surface for receiving light projected from said projector, and a front surface for displaying said light, said transmission type screen including an optical sheet, and a Fresnel lens sheet provided on a projection light incidence side of said optical sheet, said optical sheet having a transparent base material, a fine lens array constituted by a plurality of fine unit lenses formed on a front surface of said transparent base material, a diffusing layer formed on a rear surface of said transparent base material opposite to said surface on which said fine lens array is formed, and a light absorbing layer formed on said diffusing layer and having fine opening portions substantially located at focal points of said unit lenses;
   wherein said diffusing layer of said optical sheet is made of a transparent medium containing transparent fine particles different in refractive index from said transparent medium, and said transparent fine particles have a mean particle size in one range selected from a particle size range for maximizing a value of Q/R at each of wavelengths in a visible region and a range which is near said particle size range and in which variation in the value of Q/R due to the wavelengths in the visible region is reduced, when Q is a scattering sectional area per transparent fine particle, and R is a radius of each of said transparent fine particles.

6. A liquid-crystal display device comprising:
   a pair of transparent substrates each of which is constituted by a laminate of a transparent electrode and an oriented film and which are bonded to each other through a predetermined gap so that surfaces on which said oriented films are formed are opposite to each other;
   a liquid-crystal layer held between said pair of transparent substrates;
   a unit for applying a voltage corresponding to an image signal between said transparent electrodes; and
   polarizers arranged on a light incidence surface side and a light emitting surface side of said pair of transparent substrates respectively;
   wherein said liquid-crystal display device further comprises a backlight unit disposed on a back surface side of said pair of transparent substrates for outputting substantially parallel light rays, and an optical sheet disposed on a light emitting surface side of said pair of transparent substrates, said optical sheet including a transparent base material, a fine lens array constituted by a plurality of fine unit lenses formed on a front surface of said transparent base material, a diffusing layer formed on a rear surface of said transparent base material opposite to said surface on which said fine lens array is formed, and a light absorbing layer formed on said diffusing layer and having fine opening portions substantially located at focal points of said unit lenses;
   said diffusing layer of said optical sheet is made of a transparent medium containing transparent fine particles different in refractive index from said transparent medium; and
   said transparent fine particles have a mean particle size in one range selected from a particle size range for maximizing a value of Q/R at each of wavelengths in a visible region and a range which is near said particle size range and in which variation in the value of Q/R due to the wavelengths in the visible region is reduced, when Q is a scattering sectional area per transparent fine particle, and R is a radius of each of said transparent fine particles.

* * * * *